US009849999B1

(12) United States Patent
Fymat

(10) Patent No.: US 9,849,999 B1
(45) Date of Patent: Dec. 26, 2017

(54) AVIONICS INTERFACE

(71) Applicant: SMARTPLANE, INC., Los Angeles, CA (US)

(72) Inventor: Stéphane Fymat, Los Angeles, CA (US)

( * ) Notice: Subject to any disclaimer, the term of this patent is extended or adjusted under 35 U.S.C. 154(b) by 0 days.

(21) Appl. No.: 13/956,277

(22) Filed: Jul. 31, 2013

Related U.S. Application Data

(60) Provisional application No. 61/678,556, filed on Aug. 1, 2012.

(51) Int. Cl.
   *B64D 45/00* (2006.01)
   *B64D 43/00* (2006.01)
   *G01C 23/00* (2006.01)

(52) U.S. Cl.
   CPC ............ *B64D 45/00* (2013.01); *B64D 43/00* (2013.01); *G01C 23/00* (2013.01); *G01C 23/005* (2013.01)

(58) Field of Classification Search
   None
   See application file for complete search history.

(56) References Cited

U.S. PATENT DOCUMENTS

| D384,341 S | 9/1997 | Hoffman et al. |
| D435,257 S | 12/2000 | Woods |
| 6,346,892 B1 * | 2/2002 | DeMers ............... G05B 19/106 340/945 |
| 6,664,945 B1 * | 12/2003 | Gyde ..................... G01C 23/00 340/945 |
| 6,693,559 B1 * | 2/2004 | Gyde et al. .................... 340/974 |
| D496,940 S | 10/2004 | Fetterman |
| 6,867,711 B1 * | 3/2005 | Langner ................. G01C 23/00 340/973 |
| D542,301 S | 5/2007 | Harvey |
| D552,121 S | 10/2007 | Carl et al. |
| D553,142 S | 10/2007 | Blencowe |
| D564,537 S | 3/2008 | Sadler et al. |
| D642,587 S | 8/2011 | Jones et al. |
| 8,051,376 B2 | 11/2011 | Adhikari et al. |
| D675,637 S | 2/2013 | Willard |
| D689,087 S | 9/2013 | Fymat |
| 9,710,145 B2 * | 7/2017 | Zammit-Mangion ............. G06F 3/04847 |
| 2003/0025719 A1 | 2/2003 | Palmer et al. |

(Continued)

OTHER PUBLICATIONS

Aircraft spruce. Angle of Attack Indicators. http://www.aircraftspruce.com/menus/in/angleofattackindicators.html. 2013.

(Continued)

*Primary Examiner* — Krishnan Ramesh
(74) *Attorney, Agent, or Firm* — Smyrski Law Group, A P.C.

(57) ABSTRACT

Systems and methods are provided for an avionics interface of an aircraft. Sensors of the aircraft may convey information that can be used in the generation of one or more of the avionics interfaces. An avionics interface may include navigation information, engine instrument information, and communication information. Such information may be provided in visually distinct regions of the interface. An avionics interface may show an angle of attack of the aircraft in a visually incorporated manner with a navigation display. In some instances, the avionics interface may be variable to match pilot preference.

9 Claims, 18 Drawing Sheets

(56) References Cited

U.S. PATENT DOCUMENTS

| | | | | |
|---|---|---|---|---|
| 2003/0229426 A1* | 12/2003 | Griffin, III | ............... | G01D 7/04 |
| | | | | 701/3 |
| 2004/0059472 A1* | 3/2004 | Hedrick | ............................ | 701/3 |
| 2005/0137778 A1* | 6/2005 | Ingram | ............... | F02D 41/1475 |
| | | | | 701/103 |
| 2005/0174350 A1 | 8/2005 | Ridenour et al. | | |
| 2009/0325131 A1* | 12/2009 | Cernasov et al. | .............. | 434/30 |
| 2011/0227927 A1 | 9/2011 | Garmon et al. | | |
| 2011/0238239 A1* | 9/2011 | Shuler | ................... | G06F 9/5077 |
| | | | | 701/3 |

OTHER PUBLICATIONS

Aircraft spruce. Slip inidicators. http://www.aircraftspruce.com/menus/in/slipindicators.html. 2013.

Higdon. The "Big Ten Inch"—Avidyne FlightMax Entegra. Avweb. Jun. 15, 2003. http://www.avweb.com/news/avionics/185171-1.html?redirected=1.

\* cited by examiner

AVIONICS INTERFACE

CROSS-REFERENCE

This application claims the benefit of U.S. Provisional Application No. 61/678,556 filed Aug. 1, 2012, which application is incorporated herein by reference in its entirety.

BACKGROUND OF THE INVENTION

A conventional cockpit is cluttered with numerous instruments and devices for pilot use. The number and variety of instruments and the variety in which their information is presented to pilots add tremendous complexity to piloting an aircraft. As the term "aircraft" is used herein, it may refer to a manned or unmanned airplane, glider, helicopter, or other aerial vehicle. For example, pilots must learn how to use specific instruments, and also where each instrument is located in a particular craft. In another example where an aircraft has a computerized cockpit panel that collects and displays information from various instruments and devices on one or more computer display screens, a pilot must learn how that information is organized, how to access that information, the abbreviations and acronyms used to label the information, and/or how to read the digital gauges that show the information on the computer screen. In all of these and other cases, the information is presented in a data-centric manner, where the data and its source, rather than the pilot's context, tasks and/or goals, govern how it is presented to the pilot user. Typically, pilots are required to undergo extensive training in order to sufficiently monitor and use instruments for flight, and constant recurring training in order to maintain this knowledge and skill. This training requirement imposes a barrier for the general aviation industry, because those who only want to fly for private use (e.g., as a means of transportation or as a hobby), rather than as a profession, often do not have the time, patience and resources required for the extensive training.

SUMMARY OF THE INVENTION

The goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments.

For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
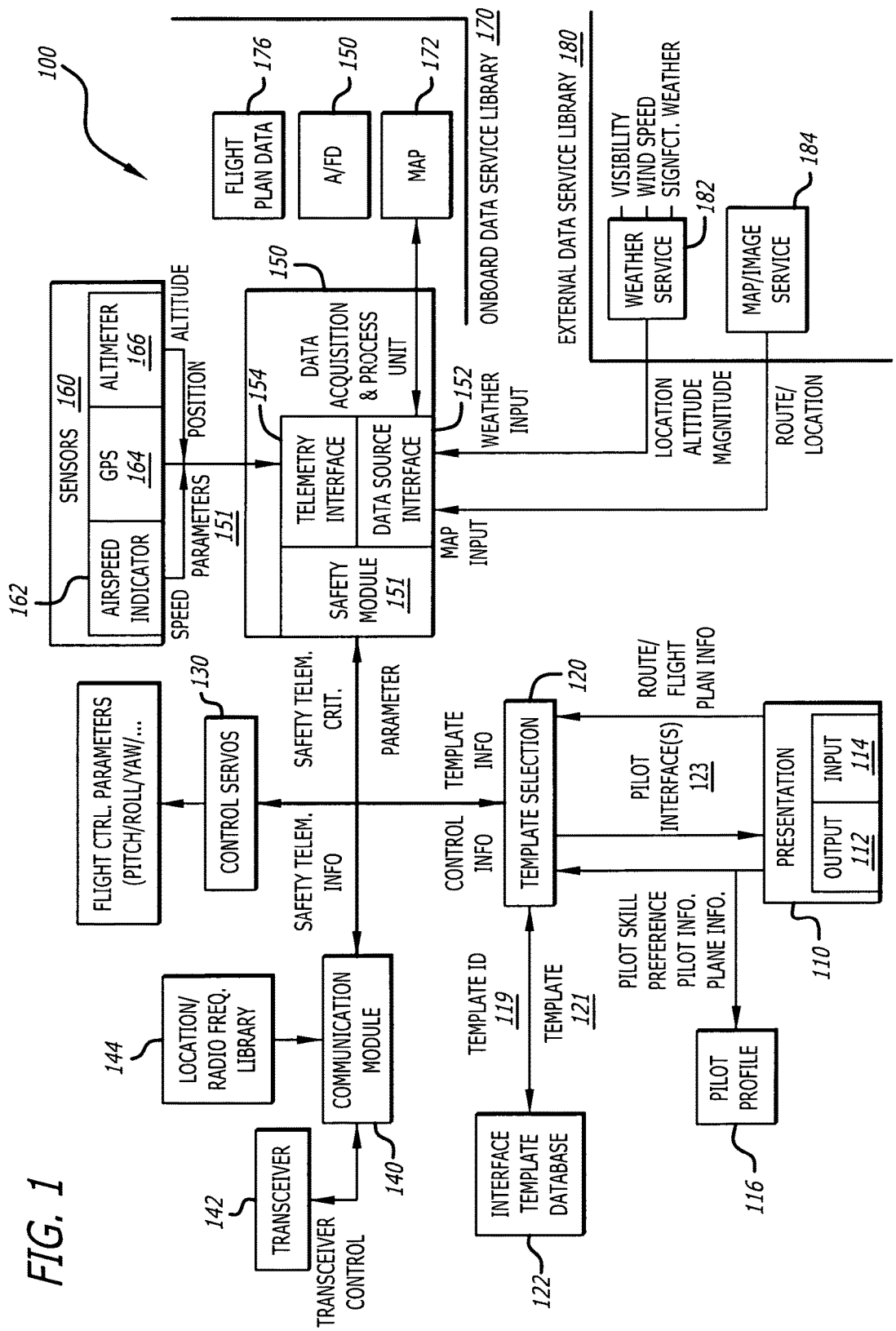
FIG. 1 illustrates an example system for providing an avionics interface in accordance with an embodiment of the invention.

In the following detailed description, numerous specific details are set forth in order to provide a thorough understanding of the invention. However it will be understood by those of ordinary skill in the art that the invention may be practiced without these specific details. In other instances, well-known methods, procedures, components and circuits have not been described in detail so as not to obscure the invention. Various modifications to the described embodiments will be apparent to those with skill in the art, and the general principles defined herein may be applied to other embodiments. The invention is not intended to be limited to the particular embodiments shown and described.

The invention provides systems and methods for providing an avionics interface. Various aspects of the invention described herein may be applied to any of the particular applications set forth below or for any other types of user interfaces. The invention may be applied as a standalone system or method, or as part of an integrated flight system. It shall be understood that different aspects of the invention can be appreciated individually, collectively, or in combination with each other.

Among other benefits, embodiments described herein recognize that an intelligent system that can present various flight parameters to a pilot user in an intuitive and integrated manner provides the pilot user with an easy, fast, and accurate understanding of crucial flight information. In addition, when appropriate, data from instruments and devices is filtered, combined and/or analyzed in order to create and present actionable information and recommendations for the pilot based on the tasks at hand and/or his or her goals, and/or execute actions on behalf of the pilot. The intelligent system can also provide the pilot user with a simplified and improved overall piloting experience.

In one embodiment, an avionics interface generation and presentation system can receive inputs from the pilot user and inputs from a plurality of sensors that detect current environmental conditions and current aircraft conditions in order to generate graphical user interfaces. The avionics interface generation and presentation system can provide easy-to-understand graphical user interfaces to assist a pilot user to safely aviate, navigate, and communicate with others in the aviation community.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and modules are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Embodiments described herein can be implemented using computer software; computer, avionics or other hardware; firmware; or any combination thereof. In one embodiment, the system described herein is implemented as a number of software modules that comprise computer executable code which, upon at least partial execution, performs the functions described herein. However, a person having ordinary skill in the art will appreciate, in light of this disclosure, that any module that can be implemented using software to be executed can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In some embodiments, components such as global positioning systems (GPS), radios, transponders, air-data computers, auto-pilots, engine monitoring systems may be considered examples of specialized computers. It will also be apparent that, in light of this disclosure, the modules described herein can be combined or divided. For example, any two or more modules can be combined into one module, and vice versa.

FIG. 1 illustrates an example system for providing an avionics interface. As described below, system 100 provides a centralized and simplified pilot interface for receiving pilot input and for providing output of instrumentation, information and other content for facilitating pilot operations. In particular, various pilot interfaces can be presented through the system 100 to prompt and guide pilot input in performing various functions for operating an aircraft.

According to some embodiments, system 100 includes a presentation module 110, a template selection module 120, and a data acquisition and processing unit 150. Presentation module 110 includes an output module 112 to present information, content and various pilot interfaces, via a graphical display, auditory communications, haptics or other modality. Presentation module 110 can also include a user input module 114 to prompt input from a pilot user using one or more input modalities.

In an embodiment, the template selection module 120 provides templates 121 for generating various pilot interfaces 123 that are rendered through the presentation module 110. Each pilot interface 123 can be modularized and designed in accordance with a particular template. In particular, the pilot interfaces 123 can be based on templates 121 that are populated with information and content from a variety of sources, including output from instruments, onboard data sources, and external data sources. The templates 121 can also specify prompts (e.g., display input fields or questions that prompt for a pilot input) for the pilot user to enter relevant flight parameters via the input module 114. Template selection module 120 can include a framework in which events (e.g., pilot input, aircraft movement, takeoff, etc.) or conditions result in a template identifier 119 being triggered. The triggering of the template identifier 119 results in a corresponding template 121 being retrieved from the interface template database 122. As described with various examples, the retrieved templates result in population of data and/or content from various sources, such as instrumentation output, and onboard and/or external data sources. For example, template selection 120 can retrieve a navigational template, which can be populated with navigation content and displayed as a navigation interface during an aircraft's startup phase. In another example, template selection 120 can result in a pilot interface that prompts the pilot user to enter navigational information, such as information that identifies a destination for a flight path. One or more navigation interfaces can prompt and guide the pilot user into providing input, for example, for a destination, route selection information, point of interest (POI), emergencies, home destination, etc.

As another example, the template selection module 120 can result in the generation of a flight plan interface. The flight plan interface can be provided to, for example, prompt the pilot user to enter a traditional visual flight rule (VFR) or instrument flight rule (IFR) flight plan. In some implementations, the entered flight plan can be automatically filled with the required pilot, aircraft and flight information.

In another variation, a pilot profile interface can be populated during the initialization phase of system 100, or when the situation requires (e.g., when a new pilot is detected with a different identification, such as a key fob). The pilot user can be prompted to enter various profile parameters including, for example, name, contact information, weight, pilot skills, pilot preferences, endorsements and ratings, restrictions, aircraft information and specification, etc. The entered information can be stored as pilot profile 116 for repeated use. More examples of user interfaces (UIs) are discussed in more details with respect to the embodiments provided below.

System 100 also includes data acquisition and processing (DAP) unit 150. The DAP unit 150 can provide information and content to populate templates selected through the template selection 120. DAP 150 can be implemented as a software program that, when executed by a processor, causes the processor to perform various functions, such as described herein. Alternatively, DAP unit 150 may be implemented as hardware (see also FIG. 2), and may include a memory module and one or more processors (not shown in FIG. 1 for simplicity). The memory module may include any suitable type of storage module including, for example, an SRAM, a DRAM, a CAM, an EEPROM, a flash memory, latches, and/or registers. The processor(s) can be any suitable processor capable of executing scripts or instructions of one or more software programs stored, for example, in the memory module. The processor(s) may execute one or more steps in accordance with non-transitory computer readable media, which may be stored in a memory module. Although not shown in FIG. 1 for simplicity, DAP unit 150 can also include a well-known cache memory that stores frequently used instructions and/or data.

According to one or more embodiments, the DAP unit 150 is coupled to (i) a number of sensors 160 for acquiring a variety of flight data, (ii) an onboard data service (ODS) library 170 for retrieving navigational information, and/or (iii) external data service (EDS) library 180 for retrieving weather and other live updates of current environmental conditions. DAP unit 150 can also include a data source interface 152 and a telemetry interface 154 for data communication with sensors 160, ODS library 170, and/or EDS library 180.

System 100 can also include one or more control servos 130 that are coupled to DAP unit 150. In one implementation, control servos 130 receive automated control information from DAP unit 150. Control servos 130 are coupled to aircraft flight controls to control various flight parameters, such as, pitch, roll, yaw, throttle, fuel mixture, flaps, landing gear, or propeller pitch. The automated control information provided by the DAP unit 150 can be based on, for example, the navigation destination and the route calculation provided by the pilot user as well as the information received corresponding to weather, terrain, airspace, notice-to-airmen (NOTAM), and/or other relevant information. In another implementation, there is an autopilot unit, not shown in FIG. 1, interposed between DAP unit 150 and control servos 130. The autopilot receives navigational information from DAP unit 150, such as a desired aircraft intermediate or final navigation destination described by latitude, longitude and altitude coordinates. The autopilot translates the desired position into automated control information and provides that information to the control servos 130 to cause the aircraft to arrive at the navigation destination. The autopilot can also receive other navigational information from DAP unit 150, such as a desired heading direction or desired altitude.

The automated control information can also be generated based on safety-related maneuvers including, for example, hazardous terrain or weather avoidance, stall or spin avoidance, airframe overstress avoidance, wake turbulence avoidance, and/or collision avoidance. As an option, one or more functions of control servos 130 can be partially or fully disabled if the pilot user so desires. Also, as a safety measure, functions controlled by control servos 130 may be overridden when appropriate or necessary, for example, when the pilot user requests to override the functions or when the pilot user takes direct manual control of one or more of the aircraft controls such as the yoke/control stick, rudder pedals or throttle or when equipment malfunction is detected by one or more of the sensors 160.

A communication module 140 can also be coupled to DAP unit 150 to receive automated radio frequency, transponder squawk code and/or satellite telephone number, and/or volume, squelch and other adjustments and/or automated voice message transmission generated by DAP unit 150, and to send similar information back to DAP unit 150 such as current frequency tuned, current squawk code, satellite call status, current volume and squelch levels and other parameters. Communication module 140 can be coupled to one or more suitable transceivers 142, which can include very high frequency (VHF) radio devices, navigation radio devices, transponders, and/or satellite communication transceivers, such as XM Radio, satellite telephones, such as those based on the Iridium, IntelSat or GlobalStar satellite networks, and other communications systems. Communication module 140 is also coupled to a location/radio frequency library 144 to access various radio frequencies relevant to the aircraft's location and its currently executing maneuver. For example, through communication module 140, DAP unit 150 can automatically tune a transceiver 142 to automatic terminal information service (ATIS) and/or ground frequency after the aircraft starts up and before it enters active taxiways. As another example, upon emergency, DAP unit 150 can automatically tune a VHF radio to the emergency frequency (e.g., 121.5 MHz), adjust the transponder (e.g., to squawk emergency code 7700), and transmit distress messages along with the aircraft's location and/or the details of the emergency.

In some implementations, DAP unit 150 is coupled to ODS library 170 and, optionally, to EDS library 180 via data source interface 152 in order to retrieve weather, map, and/or other flight information updates. The information carried in ODS library 170 (e.g., airspace information, airspace regulations, airways, or terrain information) and in EDS library 180 (e.g., NOTAM updates, weather updates, or map updates) can be used by DAP unit 150 to provide control information.

For example, ODS library 170 can include one or more maps 172, terminal charts, or sectional charts. An airport/facility directory (A/FD) 174 and/or airport diagrams can also be included in ODS library 170 for DAP unit 150 to access. Flight plan data 176, which can be provided by the pilot user during the startup phase through presentation module 110, can also be stored in ODS library 170 and can be accessible by DAP unit 150. As satellite communication and wireless networks have become popular, EDS library 180 can also include a weather service module 182 for DAP unit 150 to retrieve any weather updates (e.g., well-known METARs, TAFs, visibility, wind speed and direction, or the location and magnitude of any significant weather phenomenon that is relevant to the flight) on the ground or during the flight. Similarly, EDS library 180 can include a map/image service module 184 for DAP unit 150 to retrieve any map updates including, for example, airspace or airway changes, restricted zone changes, or aerial photo of airports of interest.

Additionally, DAP unit 150 is coupled to a variety of telemetric sensors in sensors 160 via telemetry interface 154. DAP unit 150 can retrieve a variety of flight parameters 151 of the aircraft from the telemetric sensors. The flight parameters can be used to selectively populate interfaces 121, in order to provide a particular pilot interface 123. In this way, various pilot interfaces 123 can be provided through, for example, a centralized console or display device and incorporate real-time flight parameters 151 as provided by sensors 160. For example, the telemetric sensors in sensors 160 can include an airspeed indicator device 162 which reads out airspeed via detecting pressure differences between pitot tubes and static ports. The telemetric sensors in sensors 160 can include a global positioning system (GPS) device 164, which can acquire the aircraft's position including longitude, latitude, altitude, and even direction and airspeed. The telemetric sensors can include an altimeter device 166 that can read out altitude (e.g., in MSL) of the aircraft. The telemetric sensors can also include, but are not limited to, a vertical speed indicator, outside air temperature sensor, angle of attack indicator, compass, attitude indicator, bank indicator, turn coordination indicator, accelerometers, and other sensors, not illustrated in the example system shown in FIG. 1.

DAP unit 150 can continuously monitor the flight parameters of the aircraft based on the readings provided by the sensors 160 (including telemetric sensors and other sensors such as engine tachometer) so that DAP unit 150 can generate appropriate control responses to the aircraft (e.g., via control servos 130 and/or an autopilot), populate crucial flight information (e.g., via template selection module 120 and output module 112 of presentation module 110 to the pilot user), and request input from the pilot user (e.g., via input module 114 of presentation module 110).

A safety and compliance module 156, also simply referred to as safety module 156, is also included in DAP unit 150, to perform analysis on the flight parameters provided by sensors 160. For example, the safety analysis can be based on a plurality of safety criteria set forth by the aircraft's manufacturer, by aircraft mechanics, and/or by the pilot user. Based on the result of the analysis, safety module 156 can provide visual/audio/haptic alerts or notifications to the pilot user, or can automatically intervene by sending remedial control signals, should the situation become critical. For example, the pilot user can setup the safety module 156 through a specific pilot interface 123 so that the minimum distance between the aircraft and a hazardous terrain is X feet with a safety margin of Y feet. In this example, when safety module 156 detects from the readings of sensors 160 together with the terrain data from ODS library 170 and/or EDS library 180 that a hazardous terrain is within Y feet, a visual/audio/haptic alert is communicated to the pilot user through template selection module 120 and presentation module 110. If, for example, the aircraft continues to descend and the hazardous terrain becomes within X feet, safety module 156 can automatically send control signals (without user input) to an autopilot and/or control servos 130 to adjust the aircraft's flight control (e.g., elevator and throttle) and flight path so as to avoid a potential collision. In another example, safety module 156 can monitor if the pilot user is about to navigate the aircraft into restricted airspace or an area with a temporary flight restriction in effect and alert the pilot user sufficiently ahead of time so that he or she can change course and avoid it.

In this manner, the examples provide an intelligent system that can present various pilot interfaces, incorporating flight parameter 151 and other information, to a pilot user in an intuitive and integrated manner that enables easy, fast and accurate understanding of crucial flight information as well as provides a simplified and improved overall piloting experience.

In some embodiments, with the assistance provided by system 100, the pilot user only needs to provide mid-level or high-level control of the aircraft. Various modules in system 100 (e.g., DAP unit 150, control servos 130) can provide automation of low-level flight control inputs (e.g., rudder application, fuel mixture adjustment, pitot heat, or propeller pitch adjustment). In some examples, system 100 can also provide automation of some mid-level flight controls, for example, automatic takeoffs and automatic landings, such that the pilot user is only engaged in providing high-level control of the aircraft. Notably, the pilot user is still naturally engaged in the flying of the aircraft, but with the low-level details being taken care of for the pilot user by system 100. This is similar to how automatic transmissions, anti-lock brakes and collision warning sensors automate low-level driving tasks in modern automobiles, but the driver is still naturally engaged in driving the car. In this way, system 100 enables intuitive pilot interfaces 123 that provide active pilot assistance, but do not replace the pilot user or force him or her out of the control loop. In other implementations, there are options for complete autonomous flying.

Also, in variations, system 100 can provide automatic route planning and re-planning, so that the pilot user may only provide high level control of the aircraft such as specifying a goal (e.g. destination), and system 100 can automatically derive the best way to achieve the provided goal. Depending on the options set forth by the pilot user, system 100 can either then fly the route automatically, or let the pilot user fly the aircraft manually along the route.

As mentioned above, the automated flying provided by system 100 can be quickly disengaged in case the pilot user wants to regain full manual control of the aircraft. During normal operations, the pilot user can take control of the control stick (or yoke) and the rudder pedals, which may immediately disengage the autopilot and/or control servos 130. Depending on the variations, mode switches can be provided to turn the automated functions (e.g., auto rudder) on or off. However, in abnormal operations or situations, such as if malfunction is detected by DAP unit 150 and/or sensors 160, the pilot user can hit an emergency button that turns off the automated capabilities, disengages autopilot, and disengages control servos 130.

In this manner, system 100 enables an avionics user interface that greatly simplifies existing cockpit layout. Among other benefits, system 100 provides various pilot interfaces 123 that can reduce the demands on the pilot to comprehend various instruments and cockpit layout. Moreover, the system 100 can provide a pilot with pilot interfaces 123 that are intuitive to operate, while comprehensive of the requisite information.

Figure 2:
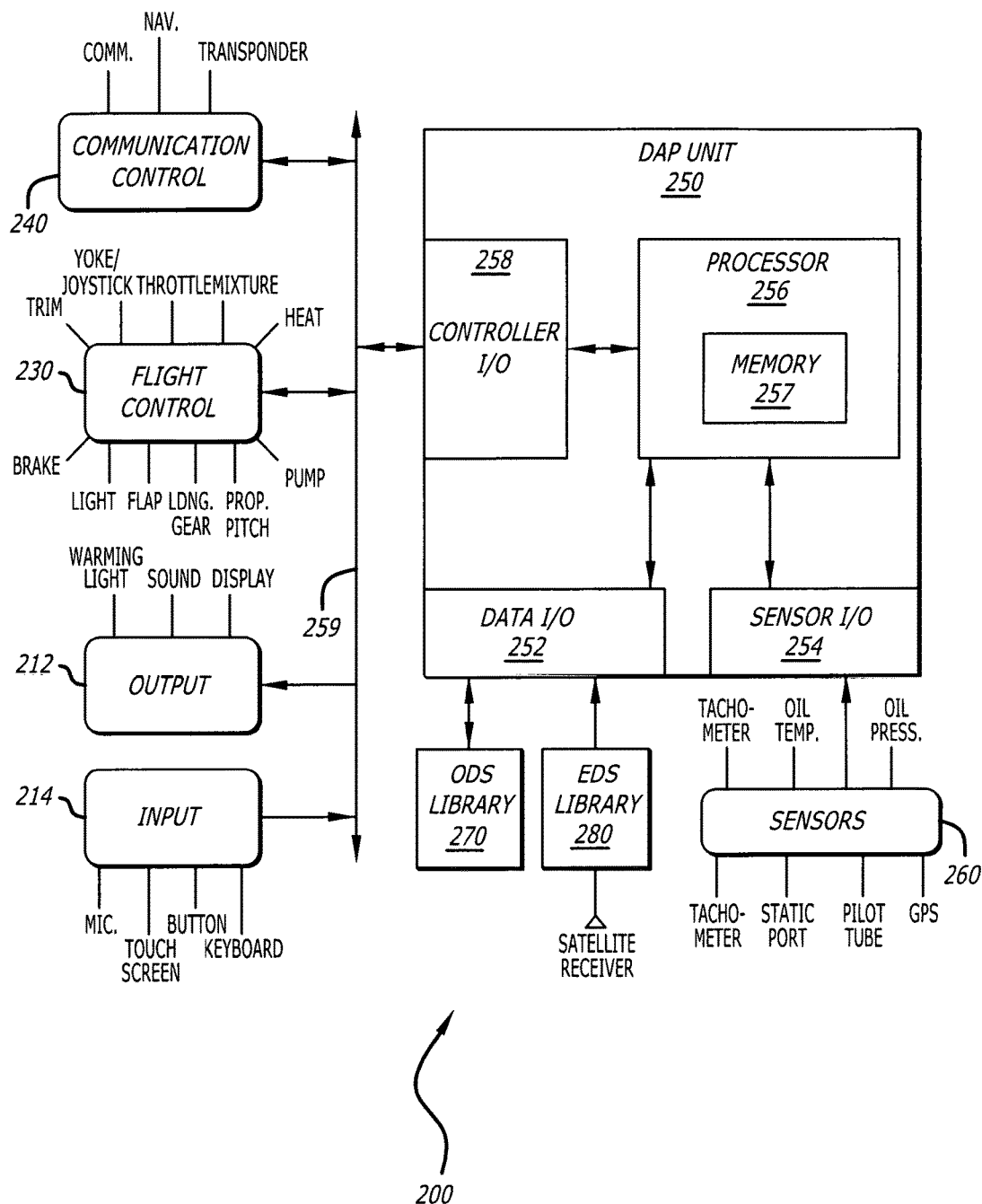
FIG. 2 illustrates an avionics user interface in accordance with an embodiment of the invention.

FIG. 2 illustrates an avionics user interface, in accordance with one or more embodiments. An avionics user interface 200 can be integrated into an aircraft for use by pilots. For example, the avionics user interface 200 can be integrated as a console in the cockpit of an aircraft. In variations, some or all of the components of the avionics user interface 200 can be modularized and carried on aircraft as a replacement or augmentation of existing cockpit controls. In other variations, avionics user interface 200 can be integrated into a system not located on the aircraft used to communicate with and control an unmanned aircraft. In yet other variations, avionics user interface 200 can be implemented as a separate system that communicates and interoperates with another system not located on the aircraft to communicate with and control an unmanned aircraft.

As illustrated in FIG. 2, the avionics user interface 200 includes a DAP unit 250 that includes a processor 256, a data input/output (I/O) interface 252, a sensor I/O interface 254, and a controller I/O interface 258. In one example, processor 256 can also include a memory module 257. Memory module 257 can include any suitable type of storage module including, for example, an SRAM, a DRAM, a CAM, an EEPROM, a flash memory, latches, and/or registers. Processor 256 can be any suitable processor capable of executing scripts or instructions of one or more software programs (e.g., various modules illustrated in FIG. 1) stored in a memory resource (for example, in memory module 257). A memory resource may include non-transitory computer readable media containing code, logic or instructions for performing one or more step. The processor may be capable of performing one or more steps in accordance with the non-transitory computer readable media or described elsewhere herein. Although not shown in FIG. 2 for simplicity, DAP unit 250 can also include a well-known cache memory that stores frequently used instructions and/or data.

Processor 256 is coupled to data I/O interface 252, which is coupled to ODS library 270 and EDS library 280 to retrieve relevant navigational information from the two libraries 270, 280. The retrieved information can be processed by processor 256 in a similar manner described with respect to DAP unit 150 of FIG. 1. EDS library 280 can communicate with a satellite receiver to receive weather, current environmental conditions, and other updates through satellite subscriber services (e.g. XM Weather), and an ADS-B receiver, not shown in FIG. 2, to receive weather, surrounding air traffic, current environmental conditions, and other updates through radio communications. Similarly, processor 256 is coupled to sensor I/O interface 254, which is coupled to sensors 260, to retrieve relevant flight data from various sensors onboard the aircraft including, for example, a GPS receiver, a thermometer, a static port, a pitot tube, a gyroscope, an engine tachometer, a fuel flow monitor, an oil temperature monitor, or an oil pressure monitor. The retrieved flight data can be processed by processor 256 in similar manner described with respect to DAP unit 150 of FIG. 1.

Processor 256 is also coupled to a controller bus 259 via controller I/O interface 258 to transmit and retrieve flight control information. Controller bus 259 is coupled to flight control 230, communication control 240, output 212, and input 214. It is noted that a common bus, such as controller bus 259 is used for purposes of illustration only. In some examples, processor 256 can process data provided by the pilot user via input 214, and can generate automatic control signals and/or messages to output 212 (e.g., for display on a display device), flight control 230, and communication control 240 in similar manner described with respect to DAP unit 150 of FIG. 1.

For example, processor 256 can control flight parameters of the aircraft by sending control signals to flight control 230, which may be coupled to the yoke/joystick, rudder pedals, throttle, fuel mixture, pitot heat, fuel pump, propeller pitch controller, landing gear, flap, lights, trim, or brake. Similarly, processor 256 can control radio transmission of the aircraft by sending control signals to communication control 240, which may be coupled to one or more communication radio, navigation radio, satellite radio, satellite telephone, satellite transceiver or the transponder. Processor 256 can also communicate relevant flight information that requires the pilot user's attention by populating visual/audio messages to output 212, which may be coupled to a display device, an audio/sound device, a haptic device, and/or a plurality of warning lights. If processor 256 determines that pilot user's input is proper or necessary, processor 256 can prompt the pilot user to provide instruction using output 212 and receives the pilot user's instruction from input 214, which may be coupled to a touch screen, a plurality of buttons, a keyboard, a microphone or other input device. In one variation, processor 256 can recognize voice commands from the pilot user using a microphone input.

In implementation, system 100 can provide simplified flying experience by not bothering the pilot user with low-level flight control tasks that can be easily automated including, for example, P-torque compensation, crosswind yaw effects on the ground, turn coordination, flap extension and retraction for takeoffs and landings, and/or trim settings. For example, by using system 100, flying can be similar to playing a computer game, and the pilot is able to provide mid-level flight control to the aircraft via simple joystick movements (e.g., up/down and left/right). In some implementations, system 100 can even enable the pilot user to provide mid-level flight maneuvers, such as "takeoff" or "landing," and system 100 can execute the commands accordingly.

In addition, goal-based flight control is also provided by system 100, so that the pilot user only has to specify a street address destination to system 100, and system 100 can automatically determine the best airport to use for that destination and the best route to that airport (e.g., based on current conditions, such as determined from reports of current weather and/or forecasts of future weather and/or meteorological sensor inputs, aircraft limitations, airport limitations, airspace regulations, orographic features of the terrain and pilot preferences from pilot profile 116). The pilot user can then either choose to fly the aircraft manually, or choose to taxi the aircraft into appropriate takeoff position and initiate an auto-takeoff function so that system 100 can execute the entire flight automatically. In situations where the pilot may still have to interact with ATC and the destination airport control tower, the aircraft can be handled through collaborative control where the pilot can manually take control to comply with ATC/tower commands and then give back control to system 100.

In variations in which voice command functions are used, system 100 can accept spoken verbal commands specified in a pilot operating handbook. For example, system 100 can accept an exemplary list of spoken commands displayed in Table 1 below. In many embodiments, system 100 reads back the command as (or just before) it is executing it. System 100 also provides a "Cancel last command" order to undo the previous command. This command can be repeatedly applied to undo a series of previous commands. In each case, system 100 verbally confirms the command as it is performing the command (e.g. "Cancelling 2D view").

Display commands
  2D view
  3D VFR view
  3D IFR view
  Zoom in
  Zoom out
  Brightness up
  Brightness down -continued

```
Night view
Day view
Transponder commands
    Transponder on
    Transponder standby
    Transponder off
    Squawk VFR
        <Maps to squawk code 1200 in US airspace>
        <Maps to squawk code 7000 for non-US airspace>
    Squawk ground movement
        <Maps to squawk code 1201 in certain countries>
    Squawk emergency
    Squawk lost communications
    Squawk aircraft hijack
    Squawk <number>
    Squawk altitude
    Ident
Navigation commands
    Fly To <street address>
        System 100 finds nearest qualified airport
    Fly To <destination airport>
        Based on local weather, system 100 picks runway
    Fly To <VOR name>
    Join <VFR airway>
    Fly To nearest airport
    Cancel flight plan
    Avoid all controlled airspace
    Avoid <airport> airspace
Radio commands
    Tune <airport name> tower
        If no tower, system 100 prompts to tune to CTAF
    Tune <airport name> ground
        If no ground, system 100 prompts to tune to CTAF
    Tune <airport name> clearance delivery
        If no clearance delivery, system 100 prompts
        to tune to ground frequency
        If no ground frequency, system 100 prompts
        to tune to CTAF
    Tune <airport name>ATIS
    Tune <airport name>ATC
    Tune <airport name>Approach Control
    Tune <airport name>Departure Control
    Tune nearest ATIS
    Tune nearest ATC
    Tune nearest FSS
    Tune emergency frequency
Other
    File flight plan
    Close flight plan
```

In variations, to distinguish between pilot-ATC dialogue and pilot-system dialogue, a dedicated push-to-talk switch can be coupled to system 100 for interacting with the system. The button can be in close proximity to the normal push-to-talk button so that the pilot user can hold down both buttons at once if he or she wants to communicate with ATC and simultaneously issue a command to system 100 to save effort. For example, when reading back a squawk code, the pilot user can press both buttons and say "Squawk 4576," so that ATC hears the read back and system 100 captures the command. Once the pilot user releases the PTT buttons, system 100 reads back the command to the pilot user and then executes it, in this example setting the transponder code to 4576. In other variations, there is no dedicated push-to-talk switch, and instead system 100 continuously monitors the words spoken by the pilot user, searching for commands that it recognizes, such as "squawk" followed by a numeric transponder code such as "4576". Once the pilot releases the normal PTT button, system 100 reads back the complete command "Squawking 4576" to the pilot user and executes it.

Pilot Interface Examples

FIG. 3-18 illustrates various pilot interfaces that can be generated using a system such as systems 100 and 200 are now described below (and with continued reference to FIGS. 1 and 2). The pilot interface may be displayed to a pilot user within an aircraft or at a different location in the case of unmanned aircraft. The pilot interface may be shown on a display that is integrated into an aircraft cockpit or computer used to communicate with and/or control an unmanned aircraft, or that may be removable and/or attachable to a component of an aircraft cockpit or computer used to communicate with or control an unmanned aircraft. The pilot interface may be shown on a display that is visually discernible by a pilot while flying the aircraft. In some instances, a pilot interface may simultaneously display information and accept a pilot input. For example, the pilot interface may be shown on a touchscreen. The display may be a touch-sensitive display to display pilot interfaces and to prompt the pilot for entering input.

Figure 3:
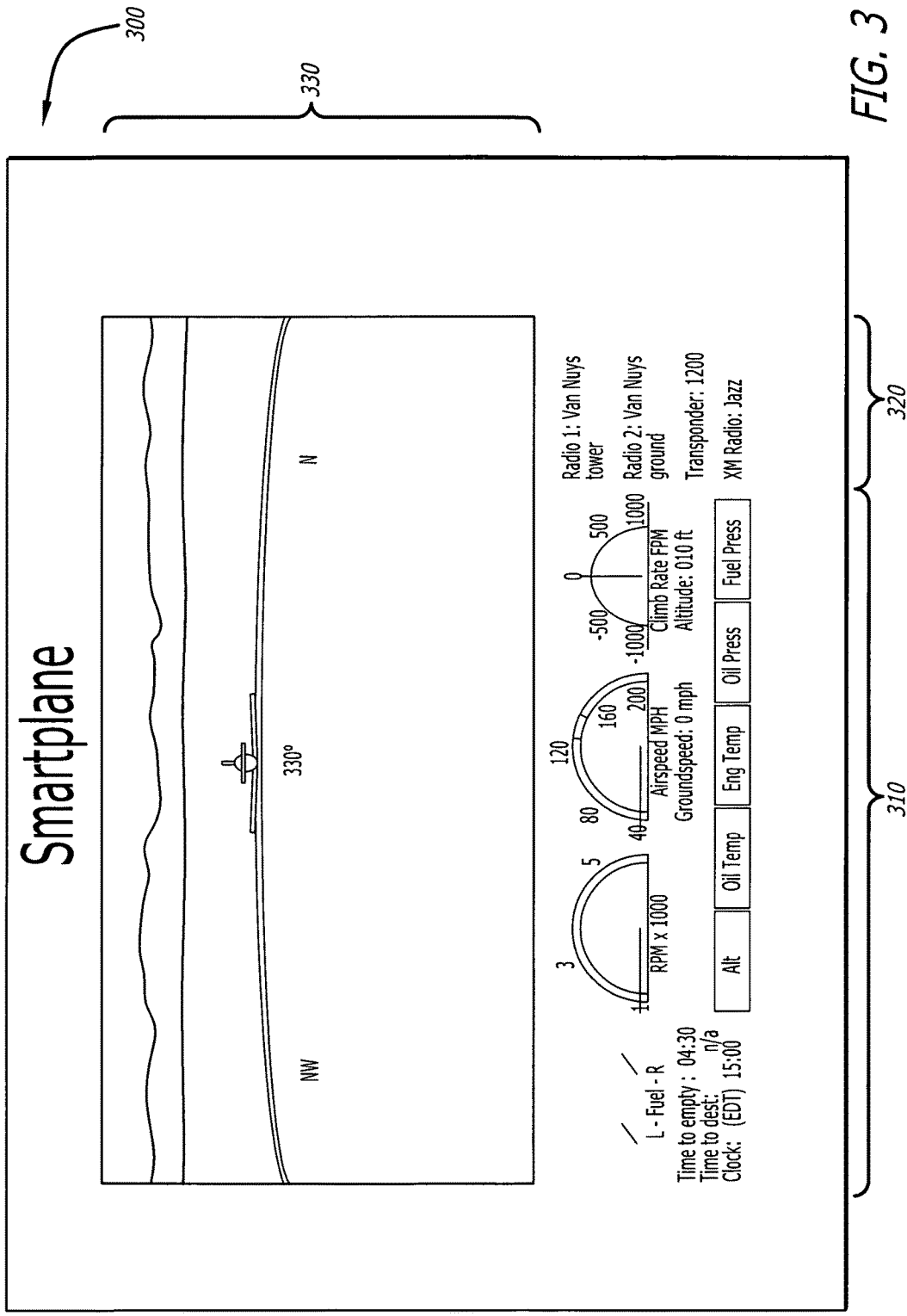
FIG. 3 provides an example of a screen that may be displayed on an avionics user interface.

FIG. 3 provides an example of an avionics interface. As shown in FIG. 3, a main screen 300 is split into three panels: engine instrument panel 310, communication panel 320, and navigation panel 330. The panels may be shown on visually distinct locations. In some instances, the panels may be provided in regions that do not overlap. For example, an engine instrument panel may be provided in a first region, a communication panel may be provided in a second region, and a navigation panel may be provided in a third region, where the first, second, and/or third regions do not overlap with one another. In some instances, the regions may be continuous regions. Optionally, the engine instrument panel, communication panel, and/or navigation panel may be adjacent to one another. In one example, a navigation panel may be provided on an avionics interface with an instrument panel and/or communication panel provided below.

In some examples, the engine instrument panel 310 can look similar to an automobile's dashboard. In this manner, the user can be easily familiarized with the controls for the aircraft. In variations, different instrumental gauges can be grouped together based on their functionalities. For example, the airspeed gauge and the groundspeed gauge can be grouped together, the vertical speed and the altitude gauges can be grouped together, and the fuel management and fuel gauges can be grouped together for easy understanding. An engine instrument panel may optionally include fuel management information, one or more fuel gauges, engine RPM, airspeed, groundspeed, climb rate, altitude, time, or any other information. In some embodiments, such type of information may be limited to a single engine instrument panel and is not provided in other regions of the pilot interface. For example, a navigational panel may not display one or more, two or more, three or more, four or more, or five or more of the following: fuel management information, a fuel gauge, engine RPM, airspeed, groundspeed, climb rate, altitude, or time. Alternatively, such information may be provided in other regions of the pilot interface. Optionally, some or all of the information on the engine instrument panel may be displayed as numbers shown in a numerical format. In some instances, some or all of the information can be shown visually via a semi-circular gauge/dial with radial indicators. The gauges may be similar to those provided on automobile dashboards. This may advantageously provide a simplified navigational interface that may be easier for non-experienced pilots to pick up and read.

In many embodiments, navigation panel 330 provides a three-dimensional view of the pilot's own aircraft, nearby airports, surrounding weather, aircraft traffic, terrain and/or surrounding airspace, much in the same way that an automobile GPS navigator displays the roads surrounding the driver. In this manner, a user who knows how to drive a car and how to use an automobile GPS can be instantly familiar with the avionics interface of system 100. As in many embodiments, touch screen functionality is provided (e.g., via input module 114) so that the user can touch on any part of the screen to interact with the displayed object or content on the screen. For example, the user can press on a runway or an airspace (not shown in FIG. 3) displayed in the navigation panel 330 to display information on it. Similarly, the user can also interact with the radio panel 320 or the engine instrument panel 310 using finger touches.

In some embodiments, the pilot interfaces may be displayed in accordance with a display format. The display format may govern the presence, placement and/or aesthetic style of information presented on the pilot interface. In some instances, a user may select a display format from a plurality of possible display formats. The pilot interface may be configured to accept an input from a pilot user. A processor may generate one or more pilot interfaces in response to the pilot user's input. For example, the pilot may specify a display format, and the generated pilot interface may have the specified display format. The pilot may have specified a display format preference from a plurality of display format options. During use of the pilot interface, the pilot user may or may not change the display format. For example, a pilot may or may not be able to update the display format during flight. A pilot may be able to update the display format prior to beginning the flight. The pilot interfaces may be updated to reflect pilot-requested changes in the display format.

One example of a display format change may include the relative placements of the navigation panel, engine instrument panel and/or communication panel. For example, a first pilot may prefer having the navigation panel on top with the engine instrument panel and the communication panel below. A second pilot may instead prefer to have the navigation panel on the bottom with the engine instrument panel and the communication panel on top. Another example of a display format change may include relative placement of individual instruments or controls. In another example, a first pilot may be right-handed so may prefer having certain instruments and/or controls on the right side or more accessible to a right-handed individual, while a second pilot may be left-handed and may prefer having certain instruments and/or controls on the left side. In another example, the aircraft may be outfitted with two computer screens, as is common on many aircraft, and the engine instrument panel and aircraft pitch, bank, yaw, turn coordination and angle of attack information may be shown on one screen and the navigation and communication panels may be shown on the second screen. In some implementations, a display format change may include colors and/or other visual indicators or alert preferences. In some instances, a pilot may be color blind, or may not discern certain colors very well, and may request different types of visual indicators or warnings. Another example of a display format change may include the aesthetics of the pilot interface. For example, some pilots may prefer having a simple dark background. Other pilots may prefer having a lighter background and/or other visual features. Some pilots may prefer having larger font than other pilots.

In some examples, system 100 enables the pilot user to use intuitive ways to interact with the avionics interface of the aircraft. As such, haptic interface and multi-touch gesture detection are implemented in variations of the presentation module 110. The system 100 can accept an exemplary haptic controls or gestures listed in Table 2 below.

| Engine Instruments Screen: |
|---|
| 1. Tap on any gauge or annunciator light |
|    a. Displays information |
| 2. Tap on radio |
|    a. Displays radio tuner |
| 3. Tap on transponder |
|    a. Displays transponder tuner |
| 4. Tap on XM radio |
|    a. Displays XM radio tuner |
| Navigation Screen |
| 1. Pan |
| 2. Zoom with two-fingers |
| 3. Tap to select object |
|    a. Airport |
|    b. Navaid |
|    c. Airway |
|    d. Instrument procedure |
|    e. Flight plan |
|    f. Waypoint |
|    g. Weather symbol |
|    h. Airspace |
|    i. TFR |
| 4. Tap and hold: pops up a menu of possible functions for that object |
|    a. Airport: Fly To, display airport information |
|    b. Navaid: Tune Navaid on VOR |
|    c. Airway: Join airway, include airway to current flight plan, |
|    d. Instrument procedure: couple to procedure |
|    e. Flight plan: shows flight plan information |
|    f. Waypoint: delete |
|    g. Weather symbol: displays detailed information |
|    h. Airspace: information, avoid, go through, |
|    i. TFR: information, avoid |
| 5. Double tap |
|    a. Airport: programmable functionality |
|    b. Navaid: programmable functionality |
|    c. Airway: programmable functionality |
|    d. Instrument procedure: programmable functionality |
|    e. Flight plan: programmable functionality |
|    f. Weather symbol: programmable functionality |
|    g. Airspace: programmable functionality |
|    h. TFR: programmable functionality |
| 6. Drag and drop |
|    a. Waypoint: moves waypoint |
|    b. Flight plan leg: inserts waypoint |

Figure 4:
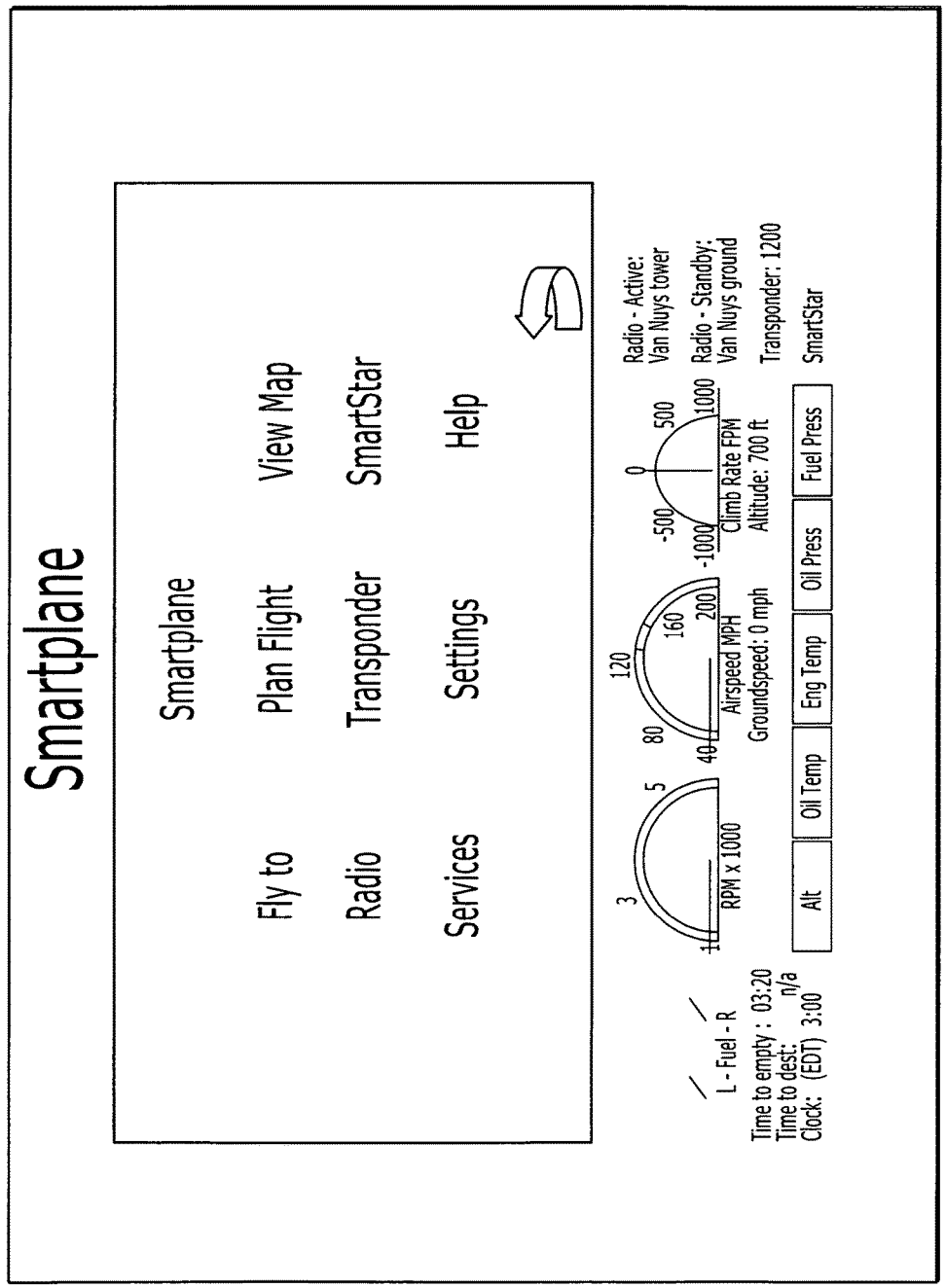
FIG. 4 provides an example of a main function pilot interface of a system in accordance with an embodiment of the invention.

FIG. 4 illustrates a main function pilot interface of system 100, in accordance with one embodiment. In cars, with today's computer-based driving directions and commercial turn-by-turn GPS navigators, planning a trip is easy. In aircraft, traditionally there is no equivalent functionality, trip planning is performed manually much as in trip planning in cars prior to the advent of GPS navigators. Furthermore, trip planning for aviation is more complicated because a pilot must take into account of weather, temporary flight restrictions, regulatory compliance (e.g., night time limitation or instrument meteorological conditions (IMC)), and the greater risk of injury or death due to improper or insufficient trip planning With system 100, the pilot user can enter a departure point, a destination, and a desired flight departure time, and system 100 can determine the optimal flight path to account for weather and temporary flight restrictions, and an alternative optimal departure time if the desired flight departure time cannot be accommodated due to weather, temporary flight restrictions, regulatory compliance factors or other issues. In this fashion, system 100 automated trip planning just as commercial turn-by-turn GPS navigators do for trips by automobile.

More specifically, the avionics system 100 includes an automated path planner (e.g., as a part of DAP unit 150). In some variations, the planner can plan a 3D flight path and a time of departure that are optimized for least time en route and minimum weather hazards such as turbulence. The planner automatically accounts for weather, terrain and airspace restrictions by accessing and assessing these data from ODS library 170 and EDS library 180. The planner can also optionally meet other constraints including, for example, maximizing use of Victor Airways, and maximizing flight time within glide range of an airport. More details on the planner's selectable options are introduced with embodiments discussed below.

A main function pilot interface may show a menu with one or more options. Some examples of such options may include fly to, plan flight, view map, radio, transponder, smartstar, services, settings, and/or help. The menu may be displayed in the region where the navigation panel is located. The menu may be displayed simultaneously with an engine instrument panel and communication panel. In some of various pilot interfaces as described, menus, navigational features, or other displays may be provided in the navigation panel region, and the engine instrument panel and communication panel may be persistently displayed. A user may touch to select an option. In some instances, the options may be provided in an array, row, columns, or any other manner.

Figure 5:
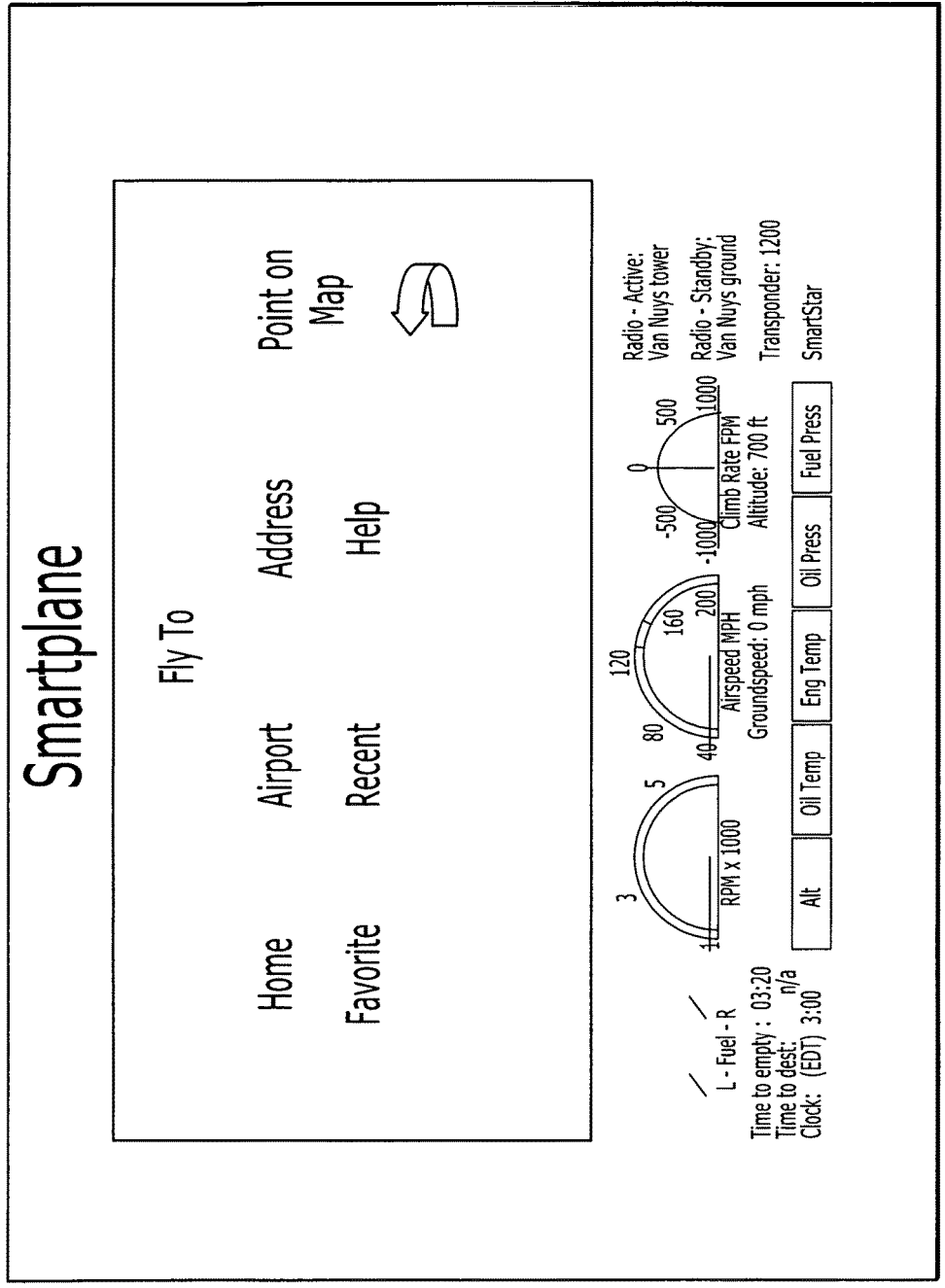
FIG. 5 provides an example of a destination input menu interface that may be provided on an avionics user interface.

FIG. 5 illustrates an example destination input menu interface provided by system 100. For example, the destination input menu user interface can include one or more objects that the pilot user can select to quickly choose a destination, without having to manually enter in a destination (e.g., latitude, longitude, address). The pilot user can select the "Favorite" feature, so that a list or icons of destinations the user previously marked as being a favorite can be displayed for selection.

Figure 6:
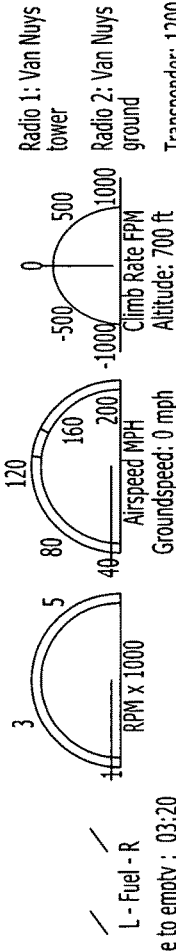
FIG. 6 is an exemplary address entry menu that may be displayed on an avionics user interface in accordance with an embodiment of the invention.

FIG. 6 illustrates one exemplary address entry menu (e.g., as a submenu under the destination input menu of FIG. 5) that allows the pilot user to enter a street address directly. For example, system 100 can plan flight routes to the nearest airport based on the entered street address, and as an additional or an alternative feature, system 100 also presents rental car information and/or makes the rental car reservation. More specifically, the pilot user can enter a destination street address, and system 100 uses either great circle distance, linear distance or travel distance (e.g., using commercially available maps such as GOOGLE MAPS) to identify the nearest airport. System 100 can also filter airports such that they meet the pilot preferences (e.g., type of runway surface), airport limitations (e.g., hours of operation) or aircraft limitations (e.g., length of runway, maximum permitted crosswind).

Figure 7:
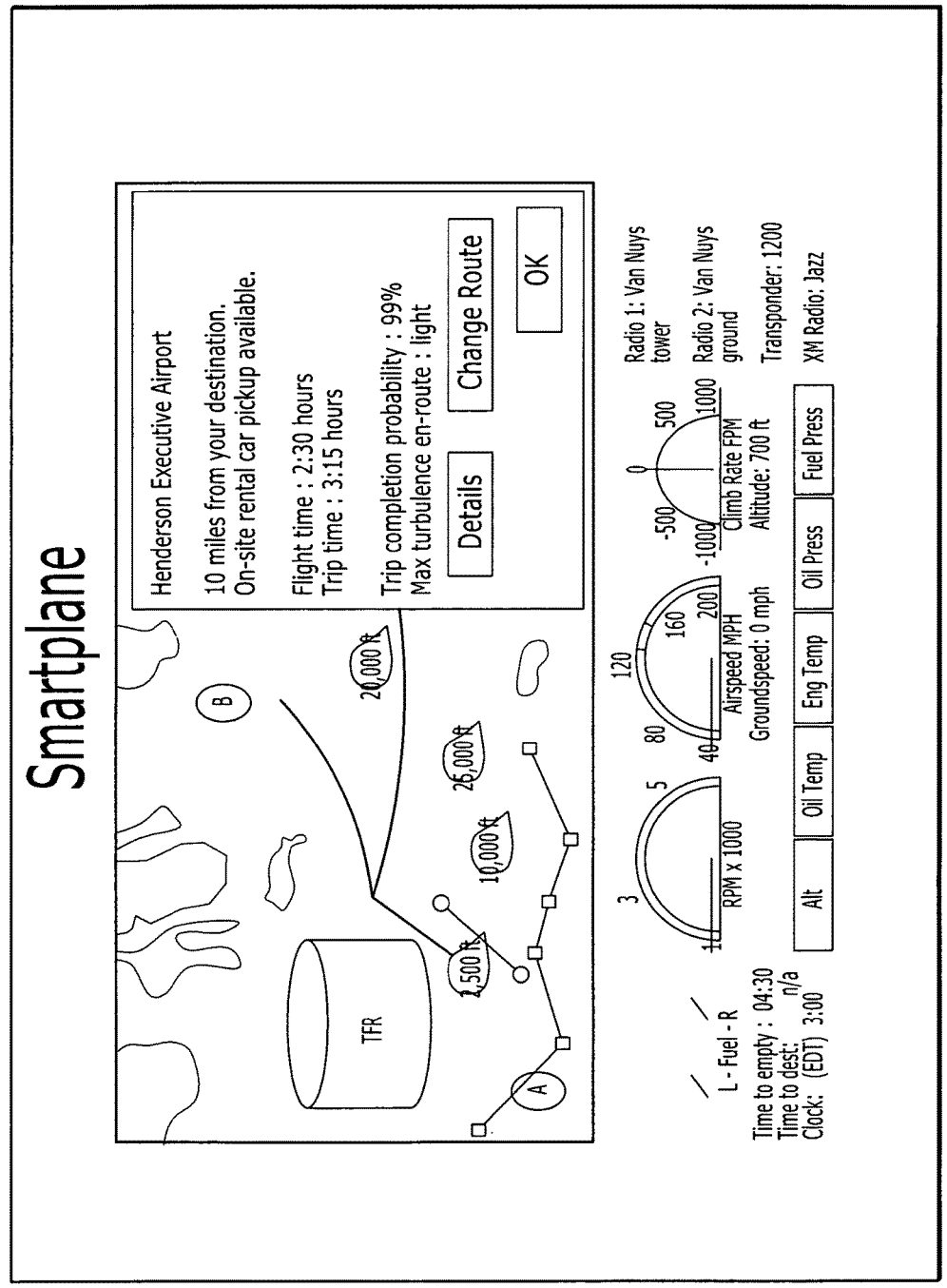
FIG. 7 illustrates an exemplary calculated route that may be displayed for a pilot user's review.

FIG. 7 illustrates an exemplary calculated route that is displayed for the pilot user's review. In this example, route segments with no forecasted weather hazards are shown in green, route segments with forecasted minor weather hazards, such as mild to moderate turbulence or low clouds, are shown in yellow and route segments with severe weather hazards would be shown in red. In this example, system 100 has calculated the route to also include the appropriate landing pattern which it obtained from A/FD 174. In one example, the pilot user can interact with system 100 and adjust the calculated route by using input module 114 (e.g., via a touch screen). For example, the pilot user can touch the destination airport for airport information, can drag waypoints to add/modify/delete waypoints, or can insert fuel stops for additional safety.

As the pilot user is flying, when system 100 receives new weather or airspace information (e.g., via EDS library 180), it can adapt the route to account for this new information. In some implementations, the pilot user can be informed of the rationale for the change and can choose to accept or decline the new route. In this manner, by using system 100, the pilot user does not have to interpret raw weather data and mentally compute a new route while still flying the aircraft.

A message output that provides the pilot user with a reason why a particular airport has been selected can be provided by system 100. More specifically, system 100 continuously re-plans the route (e.g., in real time, dynamically) as it receives new weather information from either the Internet, a radio, satellite or other data link (e.g., ADS-B), a commercial satellite subscriber service (e.g., XM WEATHER), and/or on board weather detectors (e.g., a thunderstorm or lightning detection system). All data that is received can be transformed as appropriate and mapped appropriately on the navigation panel 330 for the pilot user to easily review.

An unobstructed view of the exemplary calculated route of FIG. 7 can be displayed for the pilot user's review.

A change route menu can be selected by the pilot user for re-routing purposes on the ground or during the flight.

After a re-routing operation has been completed, a comparison view of a newly calculated route and a previously calculated route can be generated, both displayed for the pilot user's review. In variations, information regarding both the newly calculated route and the previously calculated route can be displayed in blocks (e.g., as notifications), respectively, on a predetermined portion of the navigation panel 330, and the pilot user can select which route to fly by selecting a respective information block, or by touching the route directly.

A three-dimensional (3D) view of the calculated route can also be displayed for the pilot user's review. According to some implementations, the pilot user can provide input on the touch screen to see additional flight plan information.

Figure 8:
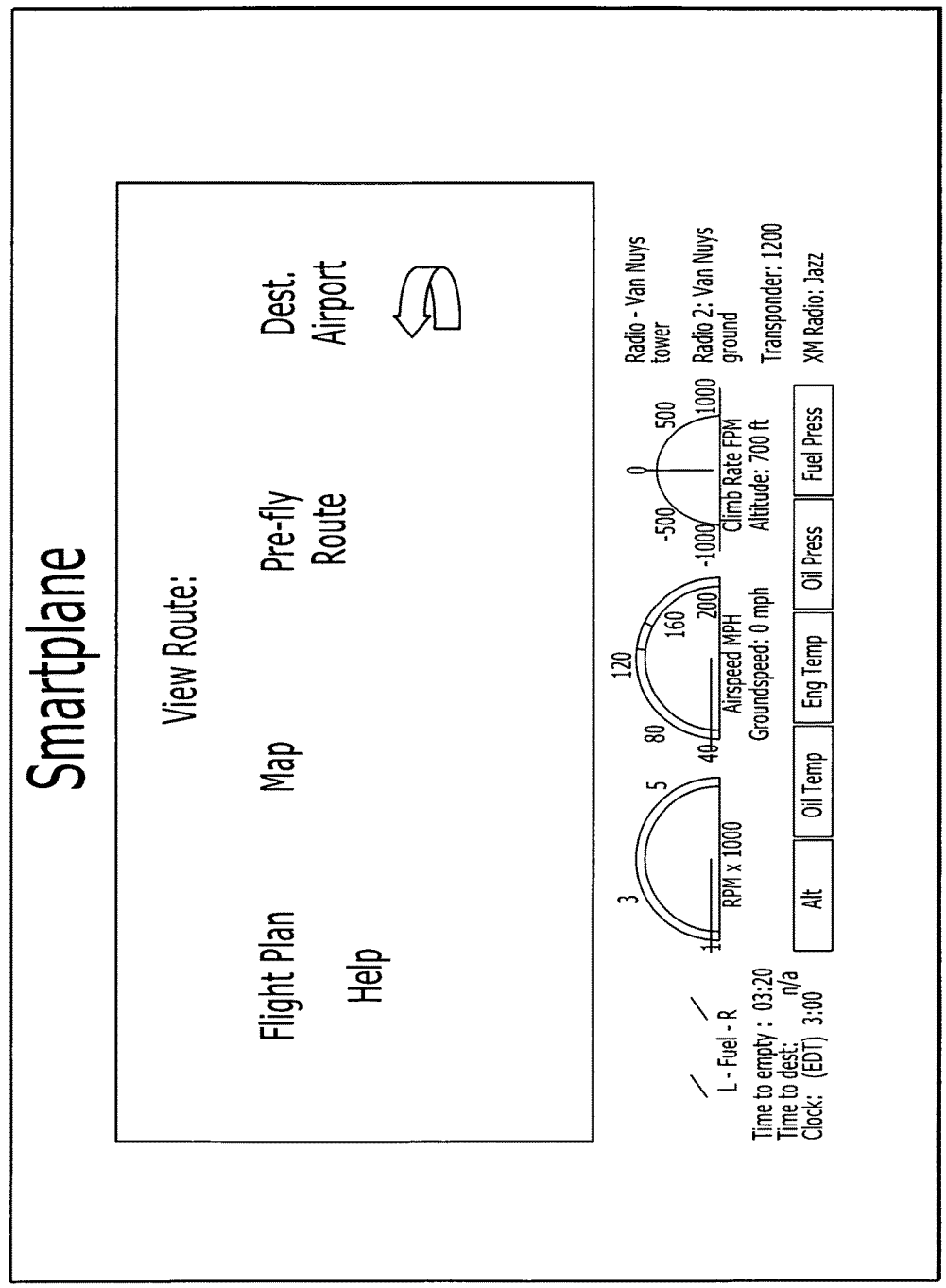
FIG. 8 illustrates an exemplary flight plan menu that may be selected by a pilot in accordance with an embodiment of the invention.

FIG. 8 illustrates an exemplary flight plan menu that can be selected by the pilot user after a particular flight route is chosen.

From this menu, a two-dimensional (2D) map view menu can be selected by the pilot user after a particular flight route is chosen.

Also from this menu, a destination airport information menu that can be selected by the pilot user after a particular flight route is chosen. The airport information can be gathered from ODS library 170 or EDS library 180. Exemplary airport information includes an aerial photo of the airport (e.g., from image service 184), elevation, traffic pattern and pattern altitude, and/or communication frequencies (e.g., from AF/D 174) of the airport. In one example, the pilot user can control the map orientation, perspective, and/or zoom in/out by using the touch screen (e.g., via input module 114).

Figure 9:
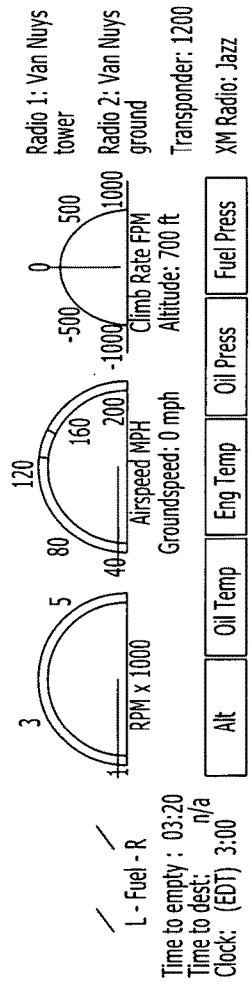
FIG. 9 shows an example of an exemplary flight plan filing menu in accordance with an embodiment of the invention.

FIG. 9 illustrates one exemplary flight plan filing menu that allows the pilot user to file a flight plan with flight service stations. The flight plan can also be stored locally in ODS library 170 (as data 176) to be accessible by DAP unit 150. According to one example, information required for the flight plan filing can be automatically pre-filled by DAP unit 150 using pilot profile 116 or calculated by System 100. The entrance of pilot profile 116 is discussed below. The automatically pre-filled data can also be overwritten by the pilot user for any update.

Figure 10:
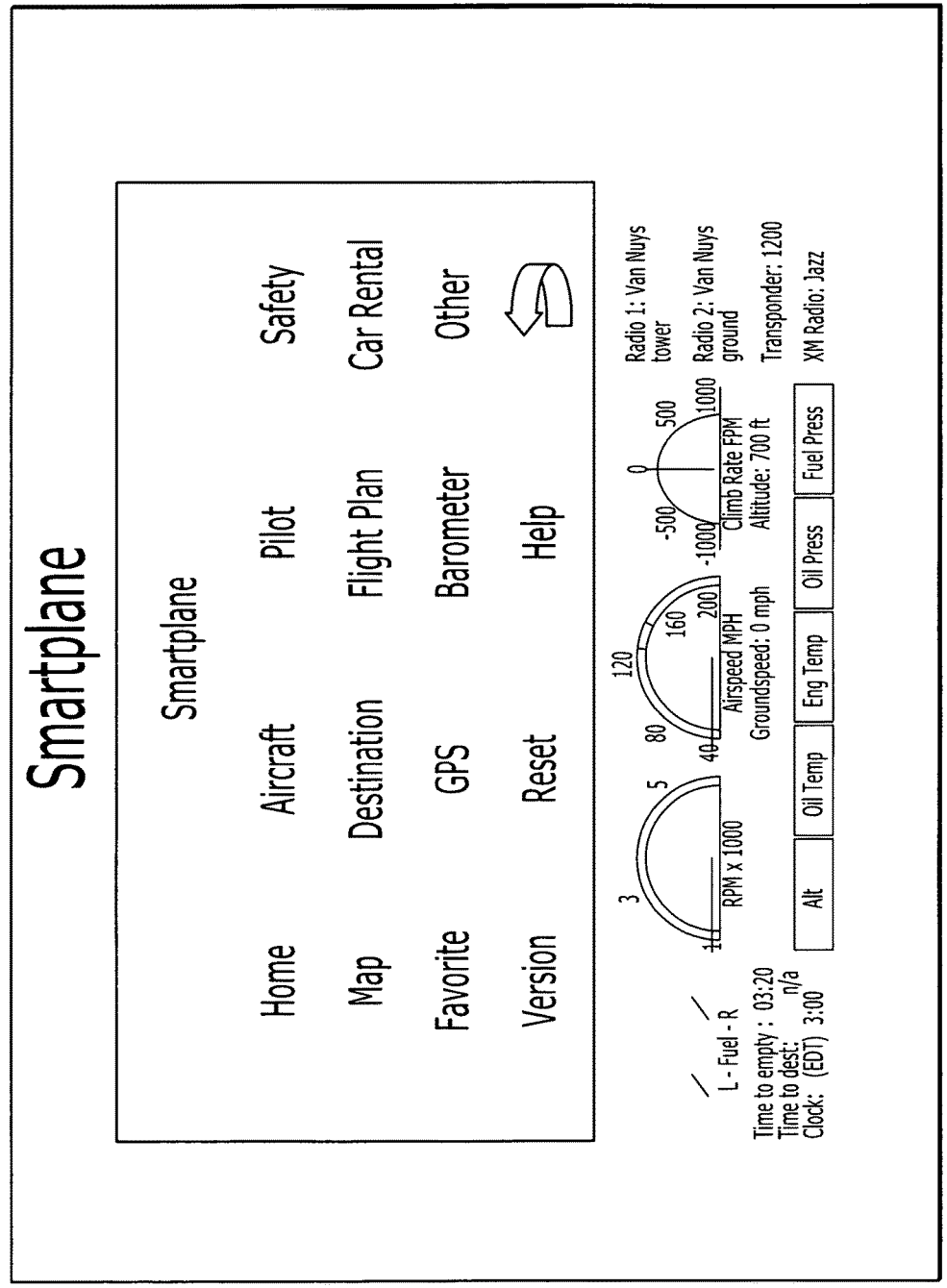
FIG. 10 illustrates an example of a system setting menu that may be provided on a user interface.

FIG. 10 illustrates one exemplary system setting menu (e.g., as a submenu under the main menu of FIG. 4) that allows the pilot user to adjust system 100's settings.

Figure 11:
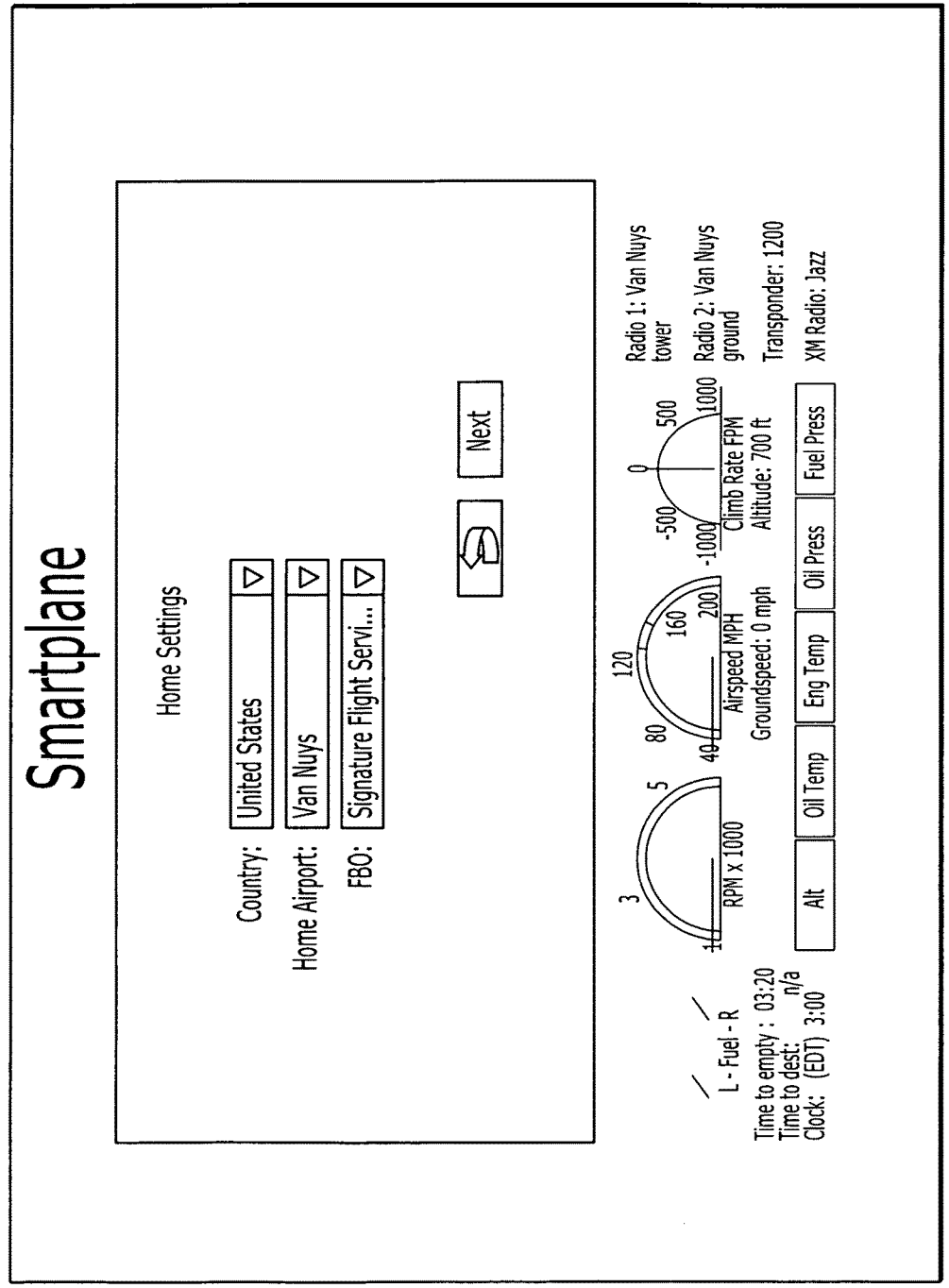
FIG. 11 shows an example of a home setting menu in accordance with an embodiment of the invention.

FIG. 11 illustrates one exemplary home setting menu (e.g., as a submenu under the setting menu of FIG. 10) that allows the pilot user to set home airport and choose a fixed base operator (FBO). Other submenus allow the pilot user to set various aircraft, pilot and safety information parameters.

Other menus (e.g., as submenus under the setting menu of FIG. 10) allow the pilot user to set the specification of various aircraft, pilot, safety, map, destination, flight plan and other parameters.

Figure 12:
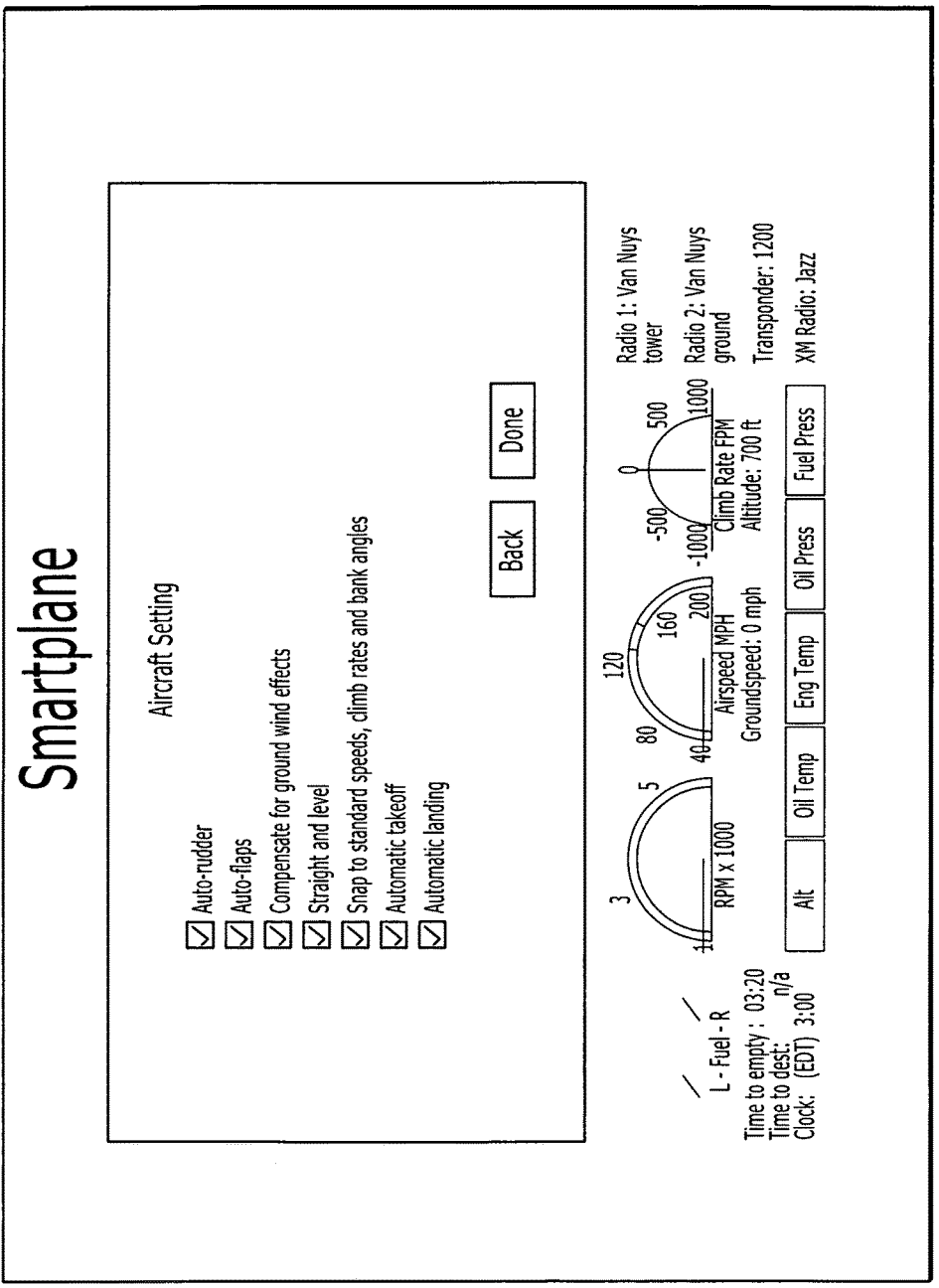
FIG. 12 provides an example of an aircraft setting menu that may be presented on a user interface.

FIG. 12 illustrates one exemplary aircraft setting menu (e.g., as a submenu under the setting menu of FIG. 10) that allows the pilot user to adjust various automated flight control features provided by system 100. Features that can be automatically controlled by system 100 include, for example, auto-rudder, auto-flaps, compensate for ground wind effects, maintain straight and level, snap to standard speeds, climb rates and bank angles, automatic takeoff, and automatic landing. The pilot user can turn everything off for manual flying, or partially select a combination of the options to maximize his or her flying experience.

In addition to the automated flight planning function and with all the above-mentioned preference parameters in mind, an avionics system in accordance with the one or more embodiments makes flying as simple as driving a car by providing various autonomous flight behaviors to assist a pilot user in flying. These autonomous flight behaviors include, for example, automatically defaulting to straight and level flight, automatically keeping constant turn rate, automatically making 30 or 45 degree bank turns when appropriate, and automatically applying rudder to keep coordinated turns. According to some embodiments, system 100 provides neutral static stability in controlling the aircraft. In these embodiments, when the pilot user banks the aircraft, the avionics system 100 can determine which bank angle the pilot's input is closest to and defaults to that bank angle. System 100 holds the turn until the pilot applies another input to change the bank of the aircraft or bring it back to straight and level flight. In some implementations, automatic flaps are provided as a function of system 100 so that the system 100 automatically lowers flaps on landing and raises flaps on takeoff.

Some other examples of the autonomous flight behaviors include maintaining a certain speed to fly (e.g., Vx, Vy, or in 100 feet per minute climb/descent rate increments), automatic takeoff and automatic landing (particularly with those airports equipped with instrument approaches), and/or automatic computation of weight and balance (e.g., to make sure that the aircraft's current loading is in its center of gravity limits and below maximum takeoff weight).

In one example, system 100 can also automatically set the transponder and/or ADS-B transceiver and communications radio to the default squawk code and default frequency (such as ATIS frequency) on engine start, respectively. For large terminal areas having multiple air traffic control ("ATC") frequencies depending on where the aircraft is coming from, system 100 can automatically tune the radio frequency depending on the aircraft's relative location to the desired airport. For example, when the pilot says "give me Los Angeles ATC", system 100 automatically uses the aircraft's location to figure out and tune to the appropriate frequency. Additional details on voice command functions of system 100 are introduced below.

System 100 can also automatically file one or more flight plans, activate a respective flight plan when appropriate (e.g., when airborne), and/or close it on a safe arrival. Also, by referring to A/FD 174, system 100 can provide automatic runway lights control by clicking the microphone button for a predetermined number of times when the destination airport's runway lights are controlled by such method. Some safety features that may be provided by safety module 156 are further described in details below. For example, runway advisory can be provided by system 100. System 100 can perform analysis based on the aircraft weight, outside air temperature, wind data and runway length/slope information, and can automatically advise the pilot user if the runway is long enough for a safe takeoff or landing, or if the pilot user lands on that runway if and when he or she will be able to take off again from that runway or any other runway at that airport. Alternatively or additionally, system 100 continuously monitors whether the aircraft is likely to run out of runway on takeoff or overrun the runway on landing, and advises the pilot to abort before an incident occurs.

In one example, System 100 can also provide collision avoidance by implementing TCAS II and resolution advisories, and by automatically executing evasive maneuvers when determined necessary. System 100 can also provide flight envelope protection by automatically correcting for excessive pitch and bank, and/or too low or too high airspeed to prevent the aircraft from stalling, spinning or exceeding its stress limits.

Other safety features that may be provided by safety module 156 include compliance monitoring, in which system 100 alerts the pilot user if he or she is about to violate airspace or night time restrictions, or if he or she will run out of fuel before arrival, and performs an "auto go-home and auto divert" feature. This feature can cause system 100 to automatically set a course to the nearest airport in case of emergency. Notably, this is important for novice pilots who are more likely to make dangerous mistakes under stress in an emergency.

System 100 can also provide automated emergency procedures. For example, when experiencing an engine failure, safety module 156 of system 100 can automatically adjust the pitch for the best glide speed (e.g., via control servo 130), access nearest airport information and calculate its distance (e.g., via ODS 170), tune the radio to 121.5 MHz (e.g., via communication module 140), broadcast "mayday" message with location and types of emergency (e.g., via GPS 164), turn off the fuel pump (e.g., via control servo 130), set transponder to squawk 7700 (e.g., via module 140), verbally pacify the pilot with auditory alerts such as "airport is in gliding range,", prompt the pilot to execute proper maneuvers (e.g., via presentation module 110), notify a subscriber emergency service via satellite, fly to the nearest airport, and/or execute an automatic landing.

In some implementations, an emergency button can be coupled to system 100 (e.g., via input 114) so that, upon the pilot user activating the emergency button, system 100 automatically tunes the radio to 121.5 and broadcasts the May Day message with details of the aircraft and squawk the appropriate emergency code. In an alternative example, system 100 can interoperate with an autopilot that provides the flight envelope protection.

Figure 13:
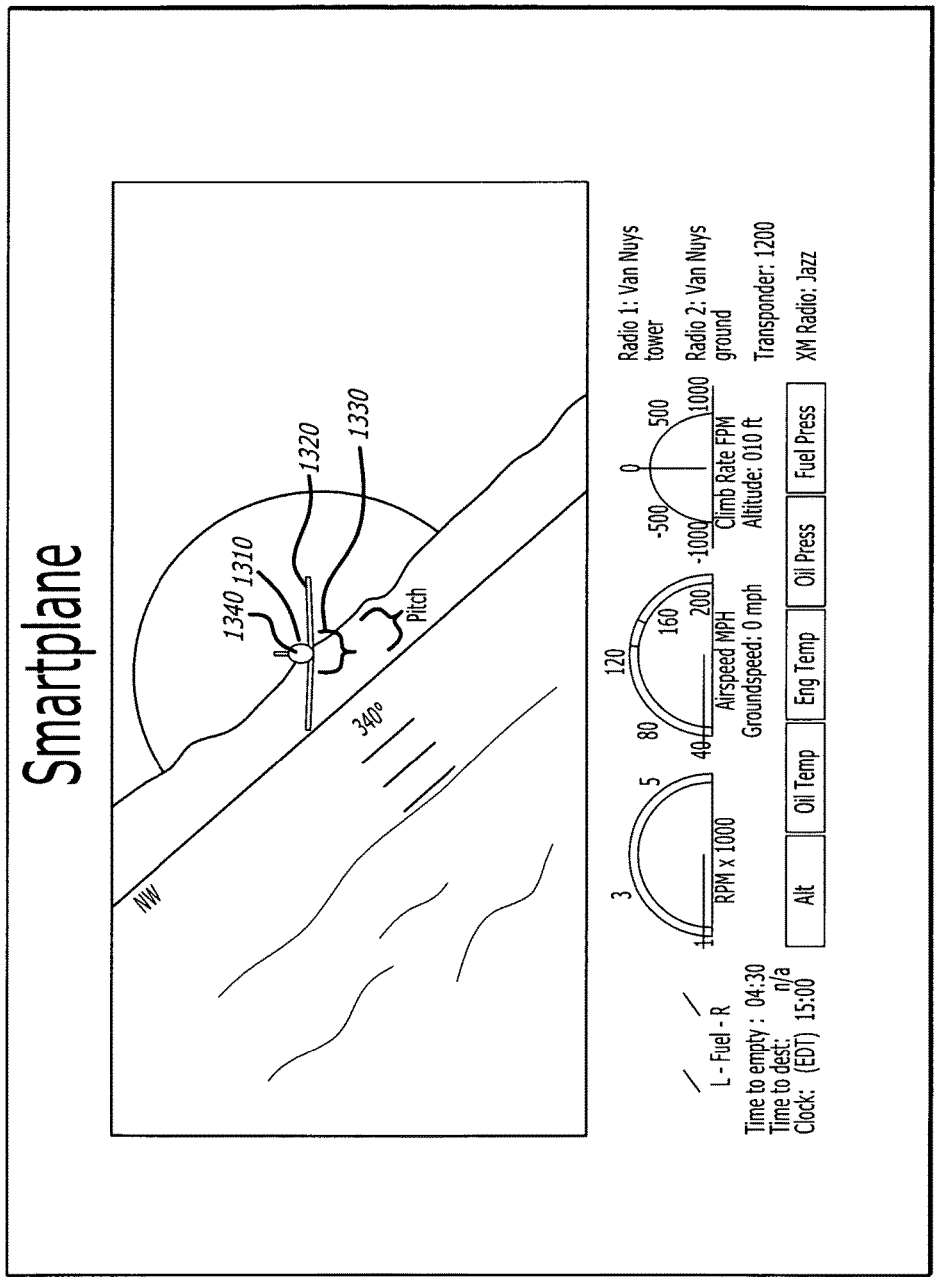
FIG. 13 shows an example of a screen of the system when an aircraft is airborne in accordance with an embodiment of the invention.

FIG. 13 illustrates an example main screen of system 100 when the aircraft is airborne.

More specifically, the navigation panel, as in FIG. 3 navigation panel 330, shows a three-dimensional view of the pilot's own aircraft, denoted by the airplane symbol 1310 and the surrounding environment. The aircraft symbol may be a visual representation of the pilot's aircraft. The aircraft symbol may optionally include one or more aircraft features such as wings 1320, tail 1330, and/or a body 1340.

The panel may show the aircraft's heading, in this example denoted by the airplane symbol aligned with 340°, the aircraft's pitch, in this example denoted by the airplane symbol aligned with 10° denoted by the second pitch bar on the pitch scale, and the aircraft's bank angle, in this example 45° denoted by the second bank angle tick mark on the semi-circular bank scale. The airplane symbol may also denote the yaw angle, also referred to as slip and skid of the aircraft, by the tail section 1330 of the symbol which can slide laterally to the left or the right of the main body 1340 of the symbol. When the aircraft is banking and turning to the left, if the tail section is to the left of the fuselage, the airplane is slipping in the turn, if the tail section is to the right of the fuselage, the airplane is skidding in the turn, when the tail section is centered laterally in the airplane symbol, the airplane is coordinated in the turn. When the aircraft is banking and turning to the right, the slip and skid directions of the tail section are to the right and left, respectively. Thus, the position of a tail portion of a visual representation of an aircraft relative to the body of the visual representation of the aircraft can be indicative of slip and/or skid of the aircraft. In some instances, the horizontal position of the tail portion relative to the body may be indicative of the slip and/or skid. Alternative or complementary indications of slip and skid are also possible, for example, such as the tail section changing color progressively to yellow and then red as the slip or skid becomes more pronounced, and/or flashing alternating colors and/or flashing on and off as the slip or skid becomes more pronounced. These conditions may also be optionally accompanied with audio or haptic alerts to the pilot, such as the system moving, pulsing or vibrating on or both of the rudder pedals. All of these are examples and not meant to limit the scope of the present invention.

While in flight, the aircraft may be flying at an angle of attack, which may be the angle between airflow and a wing chord. If the angle of attack is too high, the wing may not produce enough lift and the aircraft may stall. As the angle of attack increases or decreases, the tail section 1330 of the airplane symbol 1310 can also move up or down relative to the main body 1340 of the airplane symbol. As the angle of attack increases, the tail section may move downward; as the angle of attack decreases, the tail section may move upward. Thus, the position of a tail portion of a visual representation of an aircraft relative to the body of the visual representation of the aircraft can be indicative of angle of attack of the aircraft. In some instances, the wings of the airplane symbol may be indicative of the angle of attack. As the angle of attack increases to a level where the aircraft's wings begin to lose lift effectiveness, the wings 1320 of the aircraft symbol 1310 may change in color such as to yellow. If the angle of attack continues to approach a level where the wings will lose all lift effectiveness and the aircraft will stall, the wings of the aircraft symbol may change in color again, such as to red. They may also or instead flash alternating colors and/or flash on and off and/or some other visual indication. These conditions may also be optionally accompanied with audio and/or haptic alerts to the pilot, such as the system moving, pulsing or vibrating the control stick. All of these are examples and not meant to limit the scope of the present invention.

A visual representation of an aircraft on a navigation panel may provide information about the aircraft. In some instances, the visual representation of the aircraft may provide information about angle of attack, slip, skid, pitch, yaw, bank and/or heading. In some instances, one or more types of information may be shown by the visual representation of the aircraft without requiring additional displays of information. For example, the visual representation of the aircraft may show an angle of attack without requiring a separate visual display relating to angle of attack. In another example, the visual representation of the aircraft may show slip and/or skid without requiring a separate visual display relating to slip or skid. A position (e.g., vertical and/or horizontal) of one portion of a visual representation of an aircraft relative to another portion of a visual representation of the aircraft may provide information about the angle of attack and slip/skid of the aircraft. One or more color indicators, flashing, or other visual emphases may provide additional information about the aircraft flight. This may advantageously provide an easy-to-read way of conveying flight information. The information may be condensed into a region of the pilot interface without requiring the pilot to look at many different regions and different gauges for certain flight information. For example, pitch, bank, heading, slip/skid and angle of attack information may all be shown in one airplane symbol. In some embodiments, separate instruments, such as separate slip/skid readouts or angle of attack gauges need not be provided beyond the visual representation of the aircraft.

Figure 14:
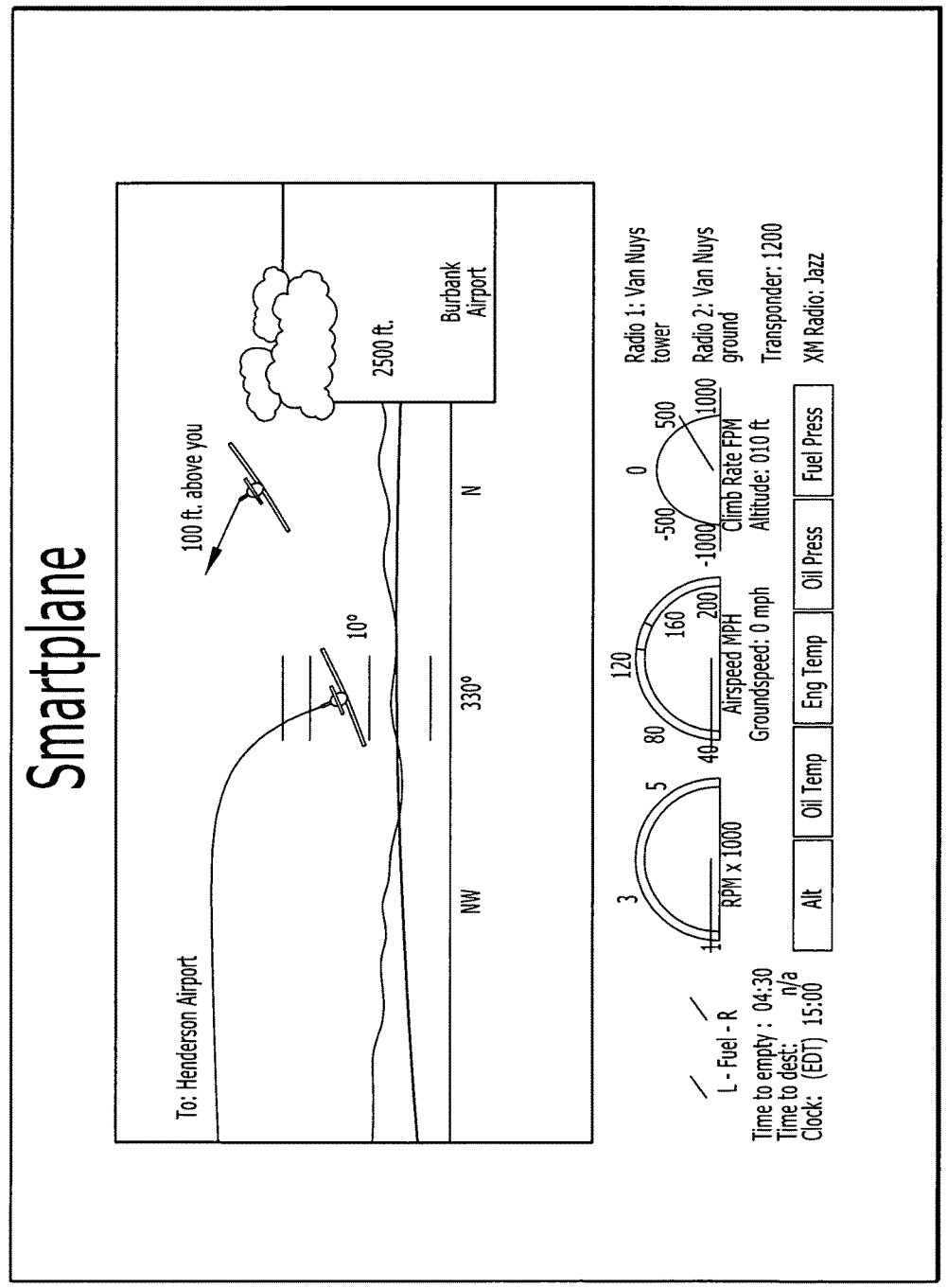
FIG. 14 shows an example of a screen of the system when an oil temperature issue is detected by the system.

FIG. 14 illustrates an example main screen of system 100 when the aircraft is airborne with an oil temperature issue detected by system 100. For example, the annunciator lights on the engine instrument panel 310 can be green when the condition is normal, but turn yellow or red when an issue arises with respect to the oil temperature. Other types of visual emphases may be provided if an issue is detected. For example, the lights may flash, an audio or haptic warning may be provided, or a warning popup may be provided.

Figure 15:
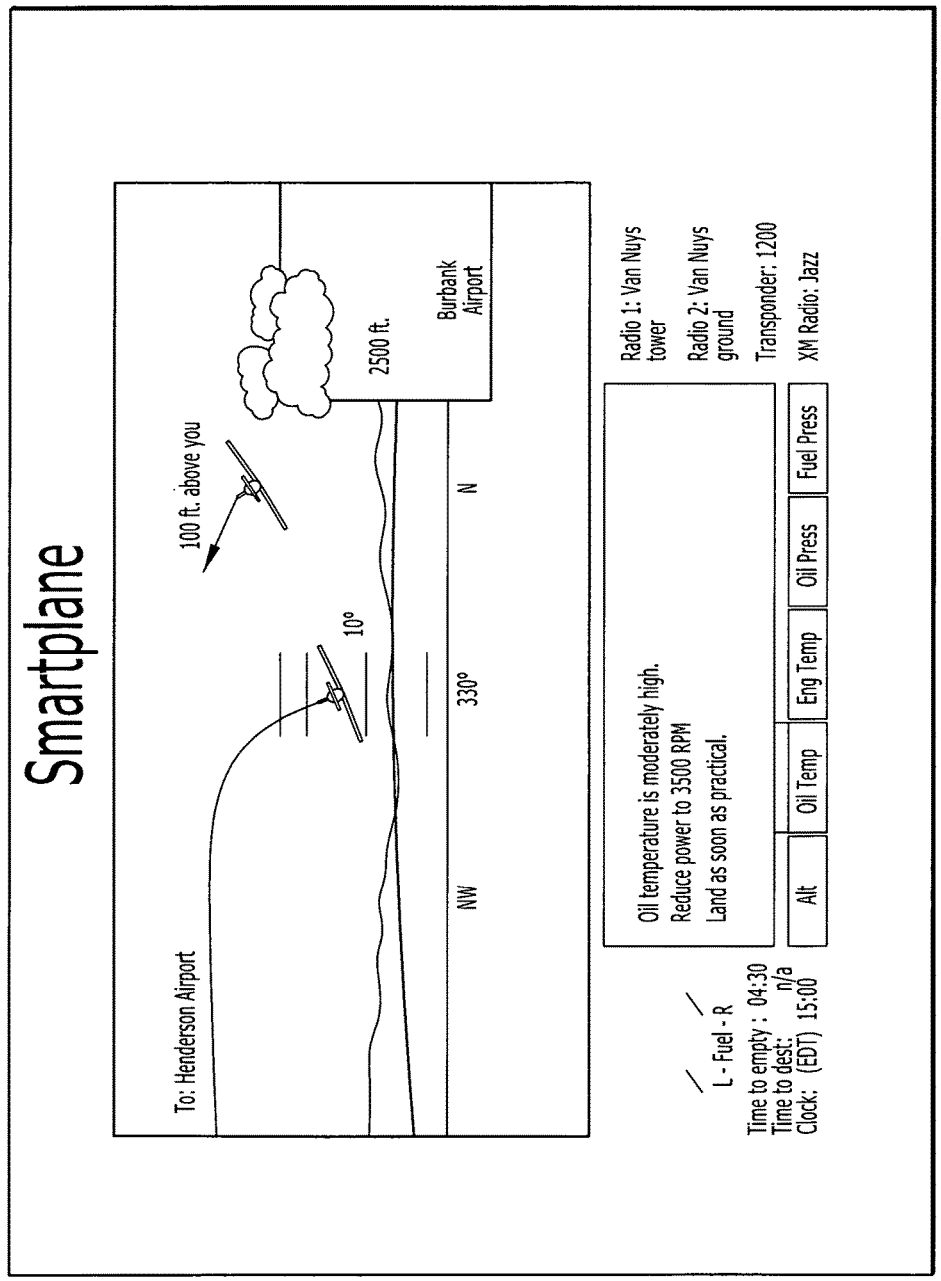
FIG. 15 shows another example of a screen of the system when an oil temperature issue is detected in accordance with an embodiment of the invention.

FIG. 15 illustrates another example screenshot of the main screen of system 100 when an oil temperature issue being detected by system 100 and the annunciator turning yellow. In a variation, the pilot can press the annunciator light to expand/collapse an explanatory message. The content of the message generated by DAP unit 150 states what is wrong, and what mitigating or corrective action is recommended. This approach may be used for any annunciators, indicators and gauges, such as the example alternator, engine temperature, oil pressure and fuel pressure annunciators, the radio indicators and the fuel, engine RPM, airspeed and vertical speed indicators shown on FIG. 15.

Figure 16:
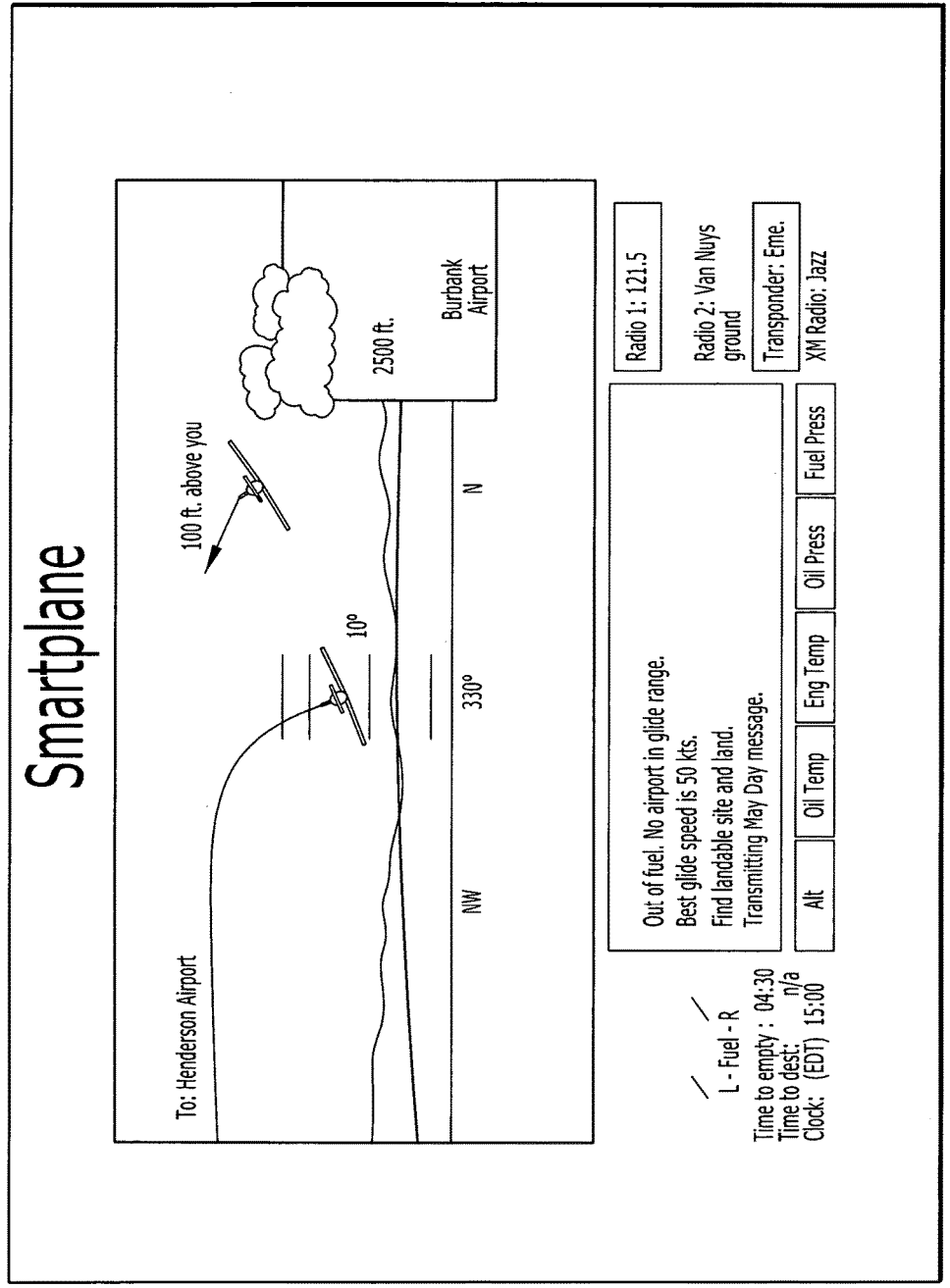
FIG. 16 shows an example of a screen of the system when a fuel emergency issue is detected by the system.

FIG. 16 illustrates an example main screen of system 100 when the aircraft is airborne with a fuel emergency issue detected by system 100. For example, system 100 initiates automatic emergency assistance as discussed above so that the pilot user can concentrate on landing. Notably, the radio frequency and the transponder are automatically set to emergency by system 100.

A transponder management user interface of system 100 may also be present. In some cases, the pilot user can access transponder management by pressing the "transponder" button, and in response system 100 can populate a keyboard for the pilot to enter squawk codes.

More specifically, the transponder can be controlled by the pilot user interacting with the system 100's graphic user interface (e.g., radio panel 320) or by spoken command (described above). Again, system 100 includes a database (e.g., ODS library 170) of global transponder codes and their corresponding plain English functions. These functions can be displayed on the transponder tuner menu based upon the country setting selected by the user during setup or in the Settings menu (as described above).

In one such transponder management user interface of system 100, for example, after the emergency "!" button is pressed on the transponder management interface, a submenu can be populated by system 100 with buttons labeled with the category of the emergency. This reduces the possible error on code entering when the pilot user is under stress, either because the pilot does not remember the correct code since they are used so infrequently, mistypes it and/or some other reason.

The avionics interface provided by system 100 also presents an intuitive way for the pilot user to establish radio communication using the radio panel 320.

More specifically, the transceiver 142 can be controlled by the pilot interacting with the system 100's graphic user interface (e.g., radio panel 320) or by spoken command (described above). Again, system 100 includes a database (e.g., A/FD 174) of airports, flight service stations and air traffic control names and their corresponding frequencies. According to the one or more embodiments, when a pilot speaks an airport name or other name, system 100 recognizes that name, maps it to the correct frequency, and tunes it on behalf of the pilot. In case of ambiguity, such as when there are multiple frequencies and the pilot must tune the right one based upon the aircraft's current location, system 100 may use the current aircraft's location to resolve which frequency to use and may automatically tune to that frequency.

Furthermore, system 100 can automatically compare current time with hours of operation of a frequency in the A/FD 174. Based on the comparison, system 100 displays frequencies that are not currently in operation in yellow font. This feature includes, for example, frequencies on flight watch, control tower, ground control, or common traffic advisory frequency (CTAF). Also, system 100 automatically compares current aircraft altitude with any altitude requirements to use a frequency. System 100 then displays frequencies not currently reachable in yellow font including, for example, flight watch or automated preset frequencies.

Figure 17:
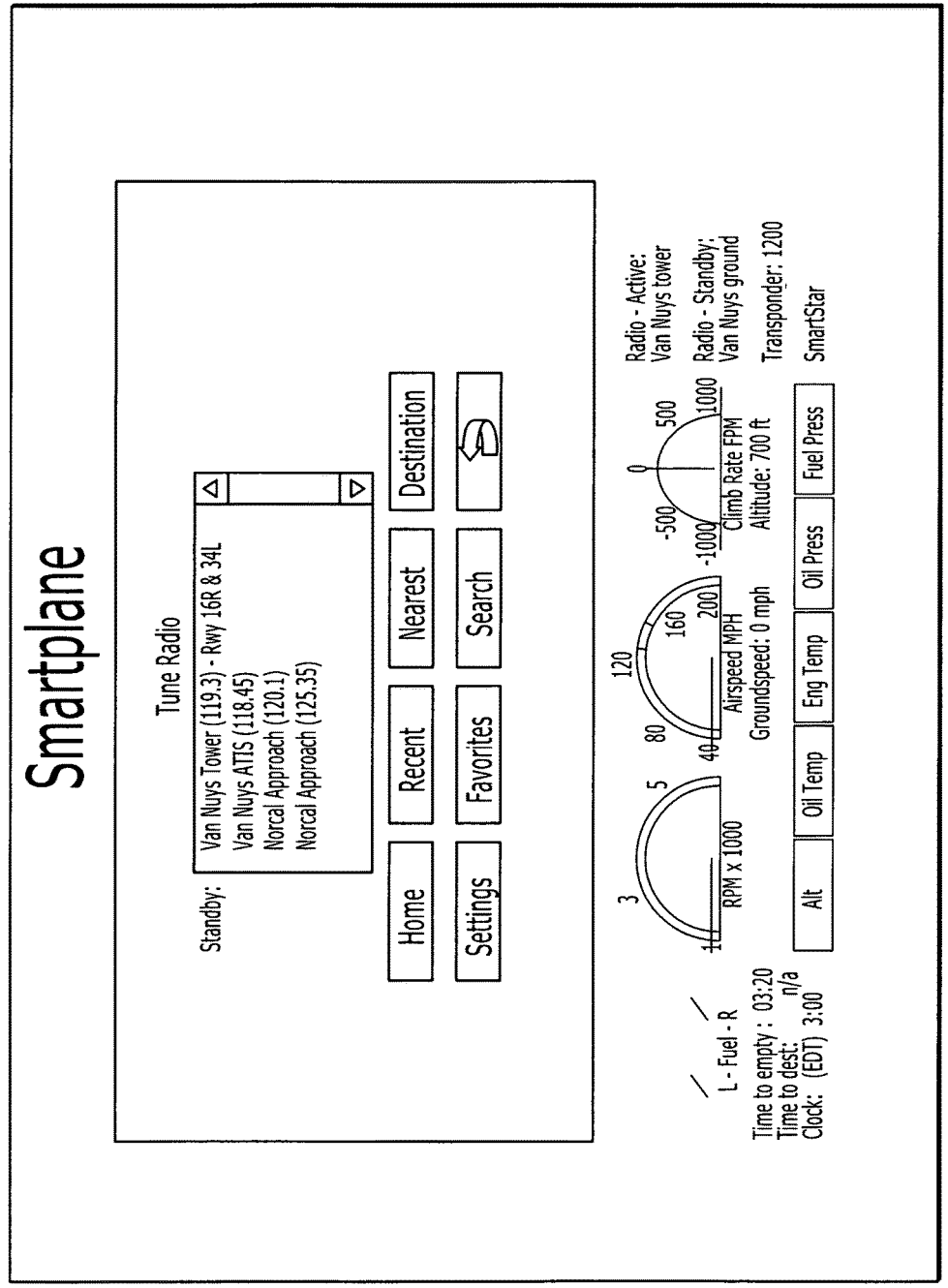
FIG. 17 illustrates an example main radio menu of the system in accordance with an embodiment of the invention.

FIG. 17 illustrates an example main radio menu of system 100. As illustrated in FIG. 17, the main radio menu of system 100 can include four buttons for preset frequency lists: Home, Recent, Nearest, Destination. In some cases, the main radio menu of system 100 can also include a Favorite button and a Search button.

A "Home" radio menu may be displayed after a preset "Home" feature has been selected from the main radio menu of FIG. 17. If the pilot user selects the "Home" feature, system 100 can load the frequencies for the home airport configured in the aircraft profile. Depending on the class of the home airport, frequencies associated with the home airport are made accessible on the radio panel 320. For example, for a class D airport, ATIS, Ground, Tower, CTAF, or UNICOM frequencies are made available for the pilot to choose from. Similarly, for a class B or C airport, ATIS, Clearance Delivery, Ground, Tower, CTAF, or UNICOM frequencies are made available for the pilot to choose from.

Moreover, if there are multiple tower frequencies, for example, for different sides of the airport, it highlights the correct frequency in green based on location of the associated fixed base operator (FBO) in profile.

If the pilot user selects Recent, then system 100 populates a list of the most recently used frequencies in a reverse chronological order.

A "Nearest" radio menu may be displayed after a preset "Nearest" feature has been selected from the main radio menu of FIG. 17. If the pilot user selects the "Nearest" feature, then system 100 lists out the nearest tower, CTAF, ATIS and approach frequencies in that order. System 100 also excludes ground, departure and other frequencies (e.g., UNICOM) since presumably the pilot would only tune those if on the ground, in which case the pilot would know where he or she was.

A "Destination" radio menu may be displayed after a preset "Destination" feature has been selected from the main radio menu of FIG. 17. If the pilot user selects the "Destination" feature, then system 100 automatically loads the frequency list for the destination either when the destination is specified in a flight plan, or when no flight plan loaded, system 100 an infer from the aircraft's trajectory that the pilot intends to land at a particular airport. In one example, radio frequencies associated with the destination airport is sorted in this order: ATIS, Approach, Tower, CTAF, Ground, others.

A "Favorite" radio menu may be displayed after a preset "Favorite" feature has been selected from the main radio menu of FIG. 17. If the pilot user selects the "Favorite" feature, then system 100 shows a list of preset, favorite frequencies. The favorite frequencies may be sorted in reverse chronological order so that most recently used ones are atop. In some cases, the Favorite radio menu may also include buttons for emergency (e.g., 121.5 MHz) or flight watch (e.g., 122.0 MHz). The favorite frequencies may also be managed (e.g., deleted) from this menu.

A "Search" radio menu may be displayed after a preset "Search" feature has been selected the from main radio menu of FIG. 17. If the pilot user selects the "Search" feature, then system 100 brings up a keyboard (e.g., on touch screen) so that the pilot user can type in for searches.

Radio preference setting menus may be displayed in response to one or more selections from the main radio menu of FIG. 17. The radio preference setting menus can be used by the pilot user to adjust the radio to his or her own preference.

Figure 18:
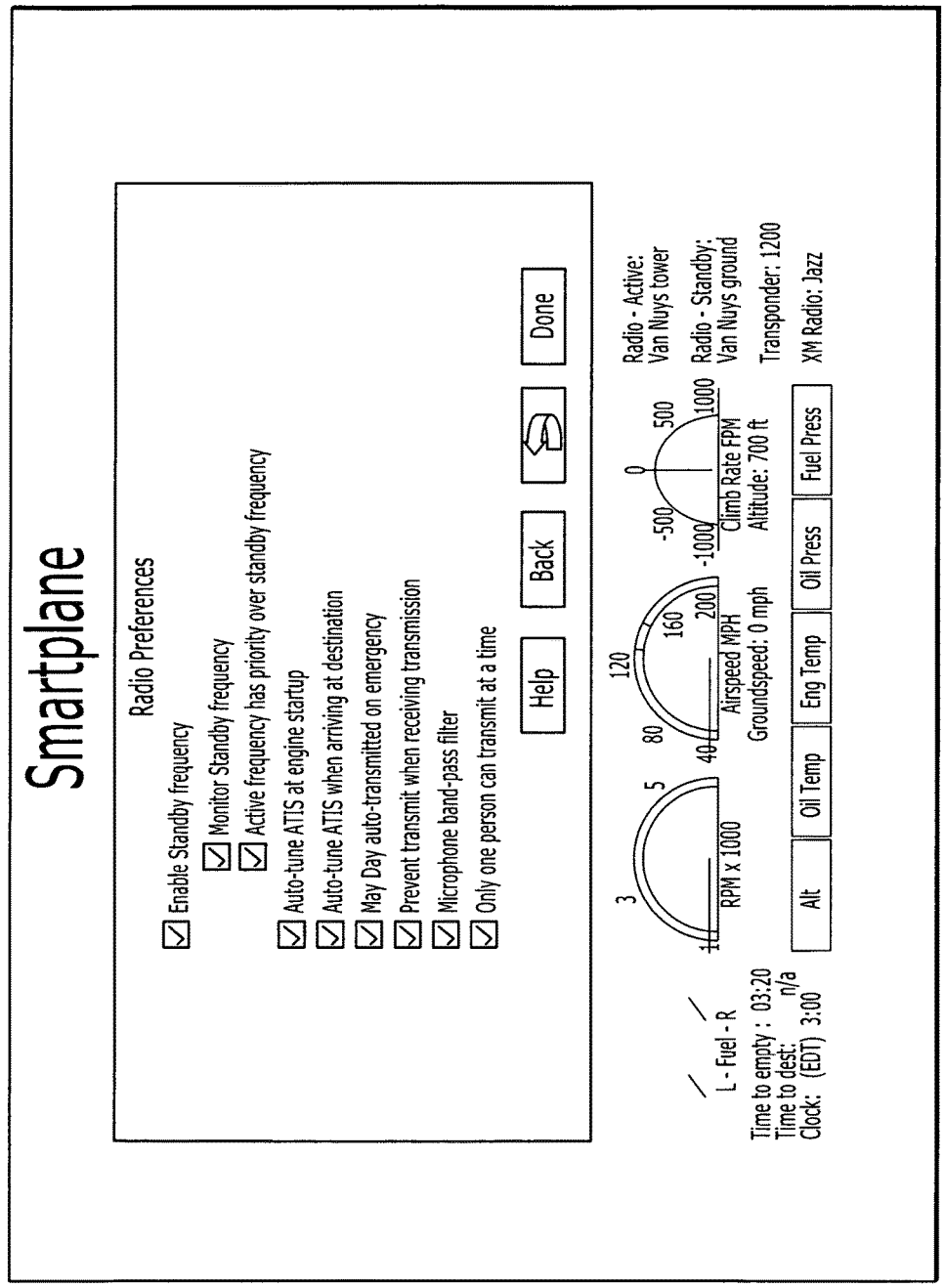
FIG. 18 illustrates an example radio preference setting menu that may be displayed on a user interface in accordance with an embodiment of the invention

FIG. 18 illustrates an example radio preference setting menu displayed in response to one or more selections from the main radio menu of FIG. 17. As illustrated in FIG. 18, automated radio tuning functions are provided by system 100 to simplify the pilot's burden during flight and to alleviate the need for extensive training. These automated radio tuning functions include, for example, automatically inferring a correct frequency to tune in based upon various aircraft and environmental factors. The following are some exemplary scenarios.

ATIS: When aircraft approaches a destination, either specified in a flight plan or inferred based upon aircraft trajectory, system 100 automatically tunes ATIS to standby frequency. If the standby frequency is engaged, then system 100 automatically monitors the frequency, decodes any transmitted voice using speech recognition or D-ATIS logic, and updates the barometer setting and updates the flight plan to use the active runway.

ATC: When there are multiple ATC frequencies, system 100 highlights the correct frequency based upon the aircraft's location, and compares against the frequency list. If the pilot uses a voice command to tune a frequency, e.g. "Tune Los Angeles Approach", system 100 automatically tunes the correct frequency.

Class D—Control Tower: system 100 keeps a log of which frequencies the pilot has transmitted and received on and what is the active frequency. If system 100 infers that a pilot is about to enter Class D airspace, and if system 100 does not have a history of the pilot transmitting and/or receiving on the tower frequency or the approach frequency, system 100 automatically tunes the tower frequency to either the standby frequency or the active frequency (if standby frequency use is not enabled). System 100 can also alert the pilot to establish communications with the tower or to avoid the airspace.

Class C—Airspace: system 100 keeps a log of which frequencies the pilot has transmitted and received on and what is the active frequency. If system 100 infers that a pilot is about to enter Class C airspace, and system 100 does not have a history of the pilot transmitting and receiving on the tower frequency or the approach frequency, system 100 automatically tunes the approach frequency to either the standby frequency or the active frequency (if standby frequency use is not enabled). System 100 can also alert the pilot to establish communications with approach control or to avoid the airspace.

Class B—Airspace: similar as Class C, except that system 100 may alert the pilot to obtain a clearance to enter the airspace or to avoid the airspace.

As discussed above, system 100 may also provide automated announcements via radio if required. The following are some exemplary scenarios.

Position announcements: system 100 may detect when the aircraft is flying through an airspace that requires regular position broadcasting on a frequency. For example, Los Angeles Special Flight Rules require the pilot user to broadcast his or her location on frequency 128.55 MHz using the format: "Los Angeles special flight rules area traffic, SMARTPLANE N1234, over LAX at XYZ feet". In some implementations, system 100 may automatically prompt the pilot if he or she wishes system 100 to change frequency and issue the broadcast.

Emergency announcements: when system 100 detects an emergency condition, such as an engine failure or an emergency landing device deployed (e.g., a ballistic recovery system (BRS), or a parachute landing system), system 100 automatically checks its log to see if there has been communication activity on a frequency within a predetermined time period. If not, system 100 automatically tunes to the emergency frequency (e.g., 121.5 MHz) to the active frequency and transmits a default May Day message that may contain name of station addressed (which may be automatically filled by system 100 from accessing GPS 164 and map 172), aircraft identification and type (from profile 116), the nature of distress or urgency (if known from aircraft sensors, e.g. "engine out", "BRS deployed"), present position and heading (from GPS and flight computer), altitude (from GPS or altimeter), fuel remaining in minutes (calculated from fuel levels), and/or number of people on board (e.g., from weight sensors in seats). In some variations, system 100 may prompt the pilot with an option before transmitting.

In this manner, one or more embodiments provide an intelligent system that can present various flight parameters to a pilot user in an intuitive and integrated manner enables easy, fast and accurate understanding of crucial flight information as well as provides a simplified and improved overall piloting experience.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A system for providing a pilot interface, the system comprising:
    a plurality of instrumentation interfaces that obtain information from multiple sensors and computers of an aircraft and multiple onboard and external databases; and
    a processing resource that generates multiple pilot display interfaces enabling a pilot to view and provide information in context of flying the aircraft,
    wherein the information is presented on the plurality of instrumentation interfaces in pilot user selectable panels comprising:
        an instrument panel comprising selected instrumental gauges and numbers comprising horizontally adjacent display of aircraft state information, comprising at least one of airspeed vertical speed, altitude, and vertical acceleration, and aircraft system information, comprising at least one of fuel level, engine RPM and engine power level, and at least one annunciator gauge located below the horizontally adjacent display of aircraft state information and aircraft system information, and at least one of:
            a communication display panel comprising aircraft relevant communication information; and
            a navigation display panel comprising navigation information including current aircraft position and orientation;
    wherein each pilot user selectable panel comprises graphical representations provided on a display screen.

2. The system of claim 1, wherein the plurality of instrumentation interfaces display at least two of the following adjacent to each other: engine RPM, airspeed, vertical speed and fuel gauges.

3. The system of claim 2, wherein the pilot can change the location of one or more gauges, annunciators or indicators relative to the others.

4. The system of claim 2, wherein at least two of the engine RPM, airspeed, vertical speed and fuel gauges are radial gauges equal in size and indicating needles of the gauges have identical range of motion.

5. The system of claim 1, wherein a gauge, annunciator or indicator can change in color when the variable it is indicating is within one or more ranges of values.

6. The system of claim 1, wherein the pilot can interact with a gauge, annunciator or indicator via a pointing device such as a mouse, joystick, trackball, touchpad and/or touch-sensitive display in order to display additional information related to an aircraft subsystem connected to that gauge, annunciator or indicator and to the value being indicated by that gauge, annunciator or indicator.

7. The system of claim 1, wherein engine RPM, airspeed and vertical speed are displayed using one style of gauge and ground speed and altitude are displayed using a different style of gauge.

8. The system of claim 7, where engine RPM, airspeed and vertical speed are displayed using radial gauges and ground speed and altitude are displayed using digital gauges.

9. The system of claim 1, further comprising a touch-sensitive display to display the display interfaces and to prompt the pilot for entering input.

* * * * *